US011586077B2

(12) United States Patent
Son et al.

(10) Patent No.: US 11,586,077 B2
(45) Date of Patent: Feb. 21, 2023

(54) DISPLAY DEVICE WHICH PREVENTS INTRODUCTION OF STATIC ELECTRICITY TO A DISPLAY AREA

(71) Applicant: Samsung Display Co., Ltd., Yongin-Si (KR)

(72) Inventors: Sun Kwun Son, Suwon-si (KR); Dong Hyeon Ki, Asan-si (KR); Na Hyeon Cha, Yongin-si (KR)

(73) Assignee: Samsung Display Co., Ltd.

( * ) Notice: Subject to any disclaimer, the term of this patent is extended or adjusted under 35 U.S.C. 154(b) by 112 days.

(21) Appl. No.: 16/985,270

(22) Filed: Aug. 5, 2020

(65) Prior Publication Data

US 2021/0208457 A1 Jul. 8, 2021

(30) Foreign Application Priority Data

Jan. 7, 2020 (KR) .................. KR10-2020-0001789

(51) Int. Cl.

*G02F 1/1345* (2006.01)
*G02F 1/1343* (2006.01)
*G02F 1/1362* (2006.01)
*G02F 1/1339* (2006.01)

(52) U.S. Cl.

CPC ...... *G02F 1/134309* (2013.01); *G02F 1/1339* (2013.01); *G02F 1/1345* (2013.01); *G02F 1/13394* (2013.01); *G02F 1/13452* (2013.01); *G02F 1/13458* (2013.01); *G02F 1/136204* (2013.01); *G02F 1/136286* (2013.01); *G02F 2201/121* (2013.01)

(58) Field of Classification Search

CPC ........................... G02F 1/1339; G02F 1/13394

See application file for complete search history.

(56) References Cited

U.S. PATENT DOCUMENTS 5,659,379 A * 8/1997 Morimoto ............. G02F 1/1345 349/149
2007/0291203 A1* 12/2007 Nakahara ............. G02F 1/1345 349/113

FOREIGN PATENT DOCUMENTS

CN 107526221 A * 12/2017 ......... G02F 1/13452
KR 10-1524449 B1 6/2015

* cited by examiner

*Primary Examiner* — Paisley L Wilson
(74) *Attorney, Agent, or Firm* — Innovation Counsel LLP

(57) ABSTRACT

A display device comprises an upper base substrate; a lower base substrate which protrudes from the upper base substrate along a first direction in a plan view; a first printed circuit film which is attached to a first pad area in a portion of the lower base substrate protruding from the upper base substrate along the first direction; and an upper common electrode which is disposed between the upper base substrate and the lower base substrate, wherein the first printed circuit film is provided in plural numbers, the first printed circuit films are arranged to be spaced apart from each other along a second direction intersecting the first direction, and the upper common electrode overlapping a space between adjacent first printed circuit films along the first direction is recessed further inwardly in the first direction than the upper common electrode overlapping the first printed circuit film along the first direction.

14 Claims, 20 Drawing Sheets

1
PA1
50
10
R1
R3
R2
R3
CS1
30
CME2
CNT1
CNT1
SEAL
DR2
DR1

PAD: PAD1, PAD2, PAD3, PAD4, PAD5, PAD6

DISPLAY DEVICE WHICH PREVENTS INTRODUCTION OF STATIC ELECTRICITY TO A DISPLAY AREA

This application claims priority under 35 U.S.C. § 119 to Korean Patent Application No. 10-2020-0001789 filed on Jan. 7, 2020 in the Korean Intellectual Property Office, the disclosure of which is incorporated by reference herein in its entirety.

BACKGROUND

1. Field

The present disclosure relates to a display device.

2. Description of the Related Art

Liquid crystal display devices (LCDs) are one of the most widely used display devices. An LCD includes a pair of substrates having field generating electrodes, respectively, such as pixel electrodes and a common electrode, and a liquid crystal layer interposed between the two substrates. In the LCD, voltages are applied to the field generating electrodes to generate an electric field in the liquid crystal layer, thereby determining the orientation of liquid crystal molecules of the liquid crystal layer and controlling the polarization of incident light. As a result, an image is displayed on the LCD.

Among LCDs, vertically aligned (VA) mode LCDs, in which long axes of liquid crystal molecules are aligned perpendicular to upper and lower display substrates when no electric field is applied, are drawing a lot of attention due to their high contrast ratios and easy implementation of wide standard viewing angles.

SUMMARY

Aspects of the present disclosure provide a display device in which introduction of static electricity to a display area is improved.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an embodiment, a display device comprises an upper base substrate; a lower base substrate which is disposed under the upper base substrate and protrudes from the upper base substrate along a first direction in a plan view; a first printed circuit film which is attached to a first pad area in a portion of the lower base substrate protruding from the upper base substrate along the first direction; and an upper common electrode which is disposed between the upper base substrate and the lower base substrate, wherein the first printed circuit film is provided in plural numbers, the first printed circuit films are arranged to be spaced apart from each other along a second direction intersecting the first direction, and the upper common electrode overlapping a space between adjacent first printed circuit films along the first direction is recessed further inwardly in the first direction than the upper common electrode overlapping the first printed circuit film along the first direction.

A side surface of the upper common electrode overlapping the first printed circuit film along the first direction is aligned with a side surface of the upper base substrate and a side surface of the upper common electrode overlapping the space between the adjacent first printed circuit films along the first direction is recessed from the side surface of the upper base substrate.

The display device further comprises a pixel electrode which is disposed between the lower base substrate and the upper common electrode; a liquid crystal layer which is disposed between the pixel electrode and the upper common electrode; and a sealant which surrounds the liquid crystal layer in a plan view and is disposed between the upper base substrate and the lower base substrate.

The upper common electrode overlapping the space between the adjacent first printed circuit films along the first direction overlaps the sealant, and the side surface of the upper common electrode is disposed between the side surface of the upper base substrate and an outer side surface of the sealant in a plan view.

The display device further comprises a lower common electrode which is disposed between the lower base substrate and the sealant.

The area overlapping the space between the adjacent first printed circuit films along the first direction comprises a first region which comprises a connection electrode connected to the lower common electrode, wherein the connection electrode overlaps the sealant and the upper common electrode in a thickness direction.

The sealant comprises a conductive material, and the connection electrode is electrically connected to the upper common electrode through the conductive material.

The display device further comprises an organic layer which is disposed between the lower common electrode and the connection electrode, wherein the organic layer comprises a first contact hole which exposes an upper surface of the lower common electrode, and the connection electrode is electrically connected to the lower common electrode through the first contact hole.

The display device further comprises a lower column spacer which is disposed between the organic layer and the upper base substrate, wherein the side surface of the upper common electrode is located inside an inner side surface of the lower column spacer.

An outer side surface of the connection electrode contacts the inner side surface of the lower column spacer.

The display device further comprises an electrostatic discharge prevention circuit which is disposed between the lower base substrate and the organic layer, wherein the electrostatic discharge prevention circuit is disposed inside the sealant in a plan view.

The display device further comprises a common voltage applying pad and a data pad which are disposed in the first pad area, wherein the common voltage applying pad is connected to the lower common electrode, and the data pad is electrically connected to a data line disposed between the lower base substrate and the pixel electrode.

The display device further comprises a common voltage applying pad and a scan pad which are disposed in the first pad area, wherein the common voltage applying pad is connected to the lower common electrode, and the scan pad is electrically connected to a scan line disposed between the lower base substrate and the pixel electrode.

The upper common electrode overlapping the space between the adjacent first printed circuit films along the first direction overlaps the sealant, and the side surface of the upper common electrode is disposed inside the outer side surface of the sealant.

According to another embodiment, a display device comprises an upper base substrate; a lower base substrate which is disposed under the upper base substrate; a first printed circuit film which is attached onto side surfaces of the lower base substrate and the upper base substrate; and an upper common electrode which is disposed between the upper base substrate and the lower base substrate, wherein the first printed circuit film is provided in plural numbers, the first printed circuit films are arranged to be spaced apart from each other along a first direction which extends along the side surface of the upper base substrate, and the upper common electrode overlapping a space between adjacent first printed circuit films along a second direction intersecting the first direction is recessed further inwardly in the second direction than the upper common electrode overlapping the first printed circuit film along the second direction.

A side surface of the upper common electrode overlapping the first printed circuit film along the second direction is aligned with the side surface of the upper base substrate, and the upper common electrode overlapping the space between the adjacent first printed circuit films along the second direction is recessed inwardly from the side surface of the upper base substrate.

The display device further comprises a pixel electrode which is disposed between the lower base substrate and the upper common electrode; a liquid crystal layer which is disposed between the pixel electrode and the upper common electrode; and a sealant which surrounds the liquid crystal layer in a plan view and is disposed between the upper base substrate and the lower base substrate.

The upper common electrode overlapping the space between the adjacent first printed circuit films along the second direction overlaps the sealant, and the side surface of the upper common electrode is disposed between the side surface of the upper base substrate and an outer side surface of the sealant.

The display device further comprises a lower column spacer which is disposed between the lower base substrate and the upper base substrate and disposed outside the sealant; and an upper column spacer which is disposed between the lower column spacer and the upper base substrate and overlaps the lower column spacer, wherein the side surface of the upper common electrode is disposed inside an inner side surface of the upper column spacer.

The display device further comprises a lower pad which is disposed between the lower base substrate and the lower column spacer; and a lateral pad which is connected to the lower pad, wherein the lower pad overlaps the lower column spacer in a thickness direction, the lateral pad is disposed on side surfaces of the lower base substrate, the lower column spacer, the upper column spacer and the upper base substrate, and the first printed circuit film is onto the lateral pad.

However, features of the invention are not restricted to the one set forth herein. The above and other features of the invention will become more apparent to one of ordinary skill in the art to which the invention pertains by referencing the detailed description of the invention given below.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
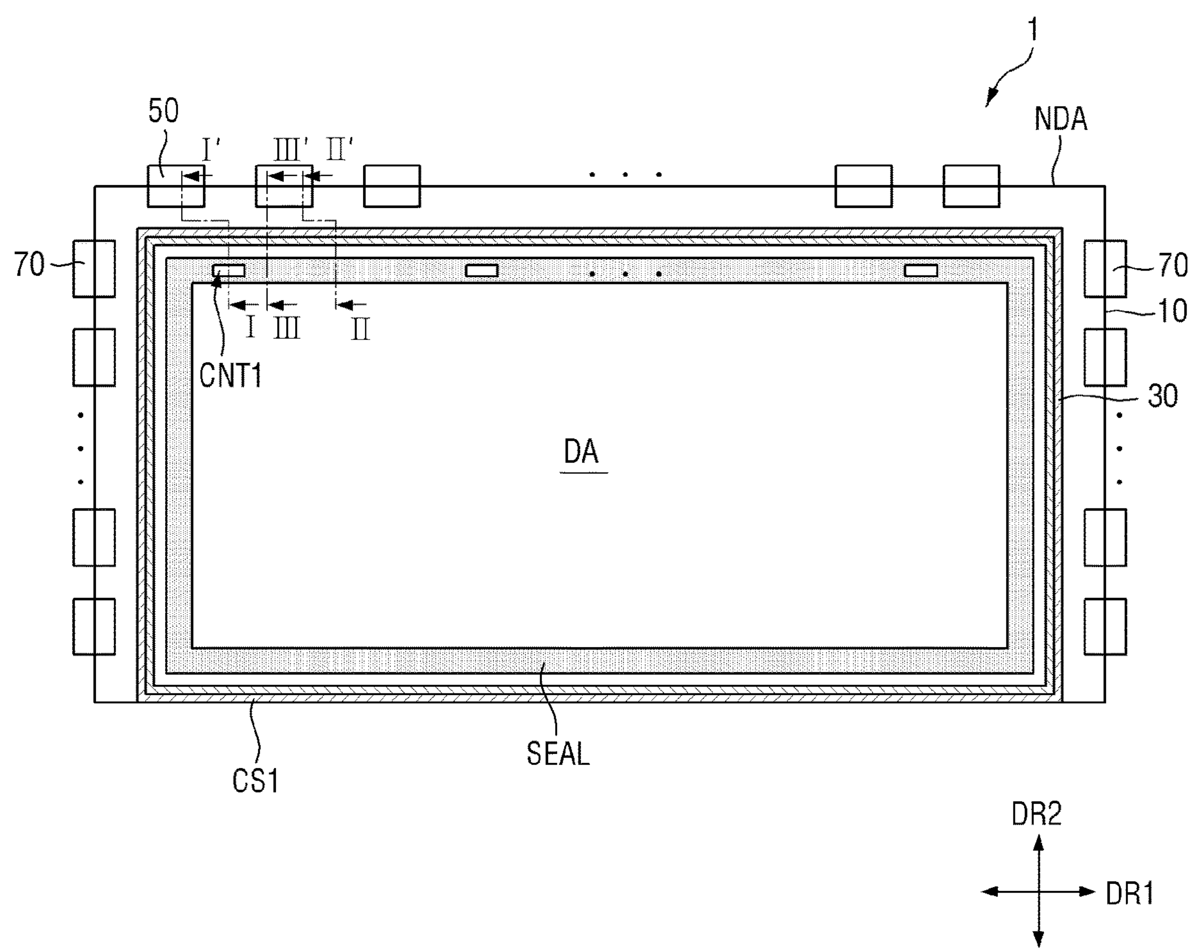
FIG. 1 is a plan view of a display device according to an embodiment.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

FIG. 1. is a plan view of a display device 1 according to an embodiment.

The display device 1 may refer to any electronic device that provides a display screen through which an image is displayed. Examples of the display device 1 may include televisions, notebook computers, monitors, billboards, mobile phones, smartphones, tablet personal computers (PCs), electronic watches, smart watches, watch phones, mobile communication terminals, electronic notebooks, electronic books, portable multimedia players (PMPs), navigation devices, game machines, digital cameras, and the Internet of things, all of which provide a display screen.

The display device 1 may be classified variously according to its display method. For example, the display device 1 may be classified as a liquid crystal display device (LCD), an organic light emitting display device (OLED), an inorganic electroluminescent (EL) display device, a quantum dot light emitting display device (QED), a micro-light emitting diode (LED) display device, a nano-LED display device, a plasma display panel (PDP), a field emission display device (FED), a cathode ray tube (CRT) display device, or an electrophoretic display device (EPD). An LCD will hereinafter be described as an example of the display device 1. The LCD applied to embodiments will be simply referred to as the display device 1 unless a particular distinction is required. However, embodiments are not limited to the LCD, and other display devices listed above or known in the art are also applicable within the scope of the technical spirit.

The display device 1 may be rectangular in a plan view (that is, a view from a top).

In embodiments, a first direction DR1 and a second direction DR2 intersect each other in different directions. In the plan view of FIG. 1, the first direction DR1 is defined as a horizontal direction, and the second direction DR2 is defined as a vertical direction for ease of description. In the following embodiments, a first side of the first direction DR1 refers to a right direction in a plan view, a second side of the first direction DR1 refers to a left direction in a plan view, a first side of the second direction DR2 refers to an upper direction in a plan view, and a second side of the second direction DR2 refers to a lower direction in a plan view. However, directions mentioned in embodiments should be understood as relative directions, and the embodiments are not limited to the mentioned directions.

The display device 1 may include long sides extending along the first direction DR1 and short sides extending along the second direction DR2. However, embodiments are not limited to this case, and the long sides of the display device 1 may extend along the second direction DR2, and the short sides of the display device 1 may extend along the first direction DR1.

The display device 1 may include a display area DA and a non-display area NDA. The display area DA is an active area where an image is displayed. The display area DA may have a rectangular planar shape similar to the overall shape of the display device 1.

The display area DA may include a plurality of pixels. Each of the pixels may be a basic unit for displaying an image.

The non-display area NDA may be disposed around the display area DA. The non-display area NDA may completely or partially surround the display area DA. The display area DA may be rectangular, and the non-display area NDA may be disposed adjacent to fourth sides of the display area DA. The non-display area NDA may form a bezel of the display device 1.

In the non-display area NDA, printed circuit films on which driving circuits or elements for driving the display area DA are disposed may be disposed. In an embodiment, a first printed circuit film 50 may be disposed in the non-display area NDA adjacent to a long side of the display device 1 located on the first side of the second direction DR2, and a second printed circuit film 70 may be disposed in the non-display area NDA adjacent to a short side of the display device 1 located on the second side of the first direction DR1. The second printed circuit film 70 may also be disposed in the non-display area NDA adjacent to a short side of the display device 1 located on the first side of the first direction DR1. A first driving chip for applying a data voltage to a data line which passes through the display area DA and connected to each pixel may be mounted on the first printed circuit film 50, and a second driving chip for transmitting a scan signal to a scan line which passes through the display area DA and connected to each pixel may be mounted on the second printed circuit film 70.

Each of the first printed circuit film 50 and the second printed circuit film 70 may be attached to a plurality of pads disposed in the non-display area NDA. The pads will be described later.

The first printed circuit film 50 may be provided in plural numbers. The first printed circuit films 50 may be arranged along the first direction DR1. A space may be formed between adjacent first printed circuit films 50.

The second printed circuit film 70 may be provided in plural numbers. The second printed circuit films 70 may be arranged along the second direction DR2. A space may be formed between adjacent second printed circuit films 70.

In some embodiments, the first printed circuit films 50 may not be disposed in the non-display area NDA adjacent to the long side of the display device 1 located on the first side of the second direction DR2 and may be disposed in the non-display area NDA adjacent to a long side of the display device 1 located on the second side of the second direction DR2.

In some embodiments, the first printed circuit films 50 may be disposed both in the non-display area NDA adjacent to the long side of the display device 1 located on the first side of the second direction DR2 and adjacent to the long side of the display device 1 located on the second side of the second direction DR2.

In some embodiments, the second printed circuit films 70 may be disposed only in the non-display area NDA adjacent to the short side of the display device 1 located on the second side of the first direction DR1.

In some embodiments, the second printed circuit films 70 may be disposed only in the non-display area NDA adjacent to the short side of the display device 1 located on the first side of the first direction DR1.

In some embodiments, the second printed circuit films 70 may be omitted, and a scan driver including a thin-film transistor may be directly disposed on a lower base substrate 10 of the display device 1.

The display device 1 may include a lower substrate 10, an upper substrate 30, a sealant SEAL, and a lower column spacer CS1.

Each of the lower substrate 10 and the upper substrate 30 may have substantially the same planar shape as the display device 1.

A planar size of the lower substrate 10 may be different from that of the upper substrate 30. For example, the planar size of the lower substrate 10 may be larger than that of the upper substrate 30. In a plan view, the lower substrate 10 may protrude from at least one side of the upper substrate 30. For example, the lower substrate 10 may protrude outward from all long sides and all short sides of the upper substrate 30 in a plan view.

In a plan view, a width (in the second direction DR2) by which the lower substrate 10 protrudes from a long side of the upper substrate 30 located on the first side of the second direction DR2 and a width (in the first direction DR1) by which the lower substrate 10 protrudes from all the short sides of the upper substrate 30 may be greater than a width (in the second direction DR2) by which the lower substrate 10 protrudes from a long side of the upper substrate 30 located on the second side of the second direction DR2.

In a plan view, the printed circuit films 50 and 70 may be attached to a portion of the lower substrate 10 which protrudes from the long side of the upper substrate 30 located on the first side of the second direction DR2 and to portions of the lower substrate 10 which protrude from all the short sides of the upper substrate 30. For example, the first printed circuit films 50 may be attached to the portion of the lower substrate 10 which protrudes from the long side of the upper substrate 30 located on the first side of the second direction DR2 in a plan view, and the second printed circuit films 70 may be attached to the parts of the lower substrate 10 which protrude from all the short sides of the upper substrate 30 in a plan view.

The sealant SEAL may be disposed adjacent to all the long sides and all the short sides of the upper substrate 30 in a plan view. The sealant SEAL may be located closer to a center than or located inside all the long sides and all the short sides of the upper substrate 30 in a plan view. All the long sides and all the short sides of the upper substrate 30 may completely surround the sealant SEAL in a plan view. The sealant SEAL may be shaped like a quadrilateral frame extending continuously along all the long sides and all the short sides of the upper substrate 30 in a plan view.

The lower column spacer CS1 may be disposed outside the sealant SEAL.

The lower column spacer CS1 may be shaped like a quadrilateral frame extending continuously along all the long sides and all the short sides of the upper substrate 30 in a plan view. The lower column spacer CS1 may completely surround the sealant SEAL in a plan view. The lower column spacer CS1 may overlap all the long sides and all the short sides of the upper substrate 30 in a plan view. In other words, all the long sides and all the short sides of the upper substrate 30 may be located inside the lower column spacer CS1 in a plan view.

A first contact holes CNT1 may be located in an area overlapping a space between adjacent first printed circuit films 50 along the second direction DR2. The first contact hole CNT1 may connect a connection electrode CE and a lower common electrode CME1 as will be described later. The area overlapping the space between the adjacent first printed circuit films 50 along the second direction DR2 may be provided in plural numbers. The areas overlapping the spaces between a plurality of adjacent first printed circuit films 50 along the second direction DR2 may be arranged along the first direction DR1. The first contact hole CNT1 may or may not be located in any one of the areas overlapping the spaces between the adjacent first printed circuit films 50 along the second direction DR2.

Figure 2:
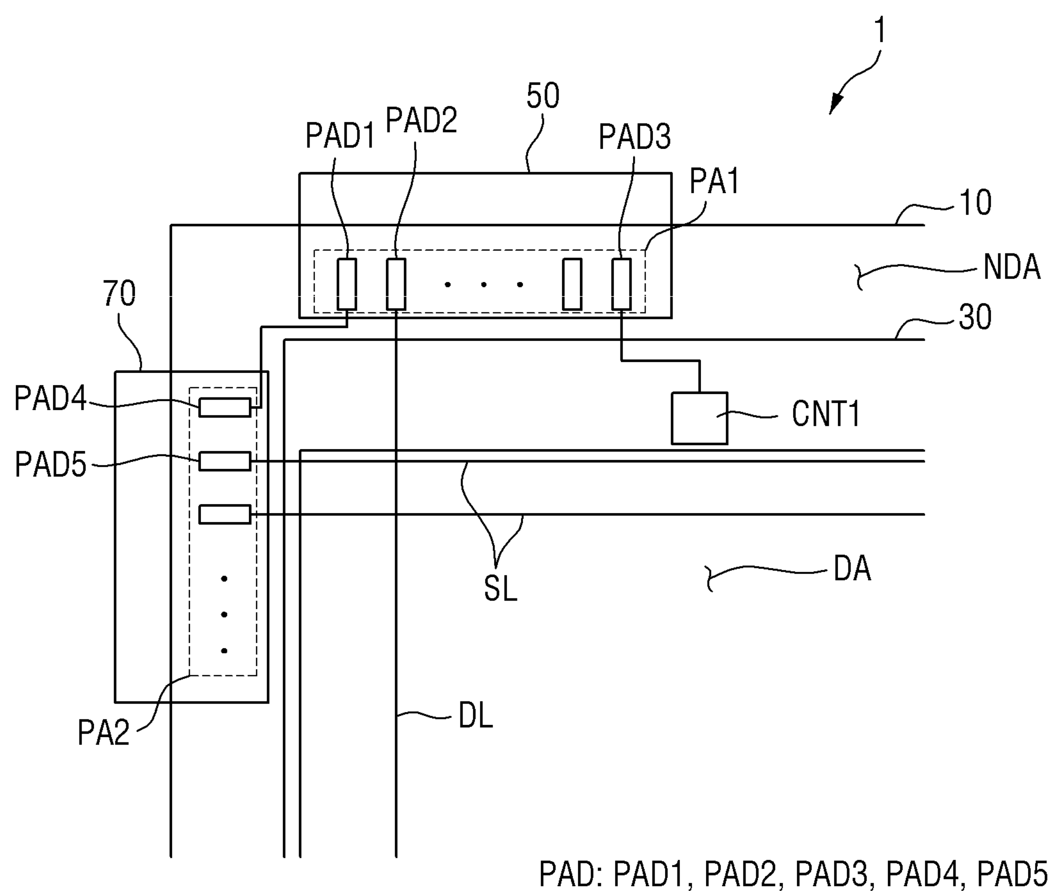
FIG. 2 is an enlarged plan view of pad areas of FIG. 1 and a portion adjacent to the pad areas.

FIG. 2 is an enlarged plan view of pad areas of FIG. 1 and a portion adjacent to the pad areas.

Referring to FIG. 2, the non-display area NDA adjacent to the long side of the display device 1 located on the first side of the second direction DR2, that is, the non-display area NDA corresponding to a portion of the lower substrate 10 which protrudes from the long side of the upper substrate 30 located on the first side of the second direction DR2 in a plan view may include a first pad area PA1, and the non-display area NDA adjacent to the short side of the display device 1 located on the second side of the first direction DR1, that is, the non-display area NDA corresponding to parts of the lower substrate 10 which protrude from all the short sides of the upper substrate 30 in a plan view may include a second pad area PA2. A plurality of pads PAD may be disposed in the first pad area PA1 and the second pad area PA2. The pads PAD may include a first pad PAD1, a second pad PAD2, a third pad PAD3, a fourth pad PAD4, and a fifth pad PAD5. The first through third pads PAD1 through PAD3 may be disposed in the first pad area PA1, and the fourth pad PAD4 and the fifth pad PAD5 may be disposed in the second pad area PA2.

A first printed circuit film 50 may be attached to the first pad area PA1, and a second printed circuit film 70 may be attached to the second pad area PA2. The first printed circuit film 50 may be connected to the first through third pads PAD1 through PAD3, and the second printed circuit film 70 may be connected to the fourth pad PAD4 and the fifth pad PAD5.

The first pad PAD1 may be configured to transmit a scan control signal received from the first printed circuit film 50 to the fourth pad PAD4. The second pad PAD2 may be electrically connected to a data line DL connected to each pixel of the display area DA and configured to transmit a data voltage signal received from the first printed circuit film 50 to the data line DL. The third pad PAD3 may be configured to transmit a common voltage signal received from the first printed circuit film 50 to the first contact hole CNT1. The common voltage signal provided to the third pad PAD3 may be provided to the lower common electrode exposed by the first contact hole CNT1, and the common voltage signal is provided to the lower common electrode via the connection electrode CE through the first contact hole CNT1.

The fourth pad PAD4 may be configured to transmit the scan control signal received from the first pad PAD1 to the second printed circuit film 70. The fifth pad PAD5 may be electrically connected to a scan line SL and configured to transmit a scan signal received from the second printed circuit film 70 to the scan line SL. The data line DL may extend along the second direction DR2, and the scan line SL may extend along the first direction DR1. Although the data line DL and the scan line SL intersect each other, they may not short-circuit because an insulation layer is disposed between the data line DL and the scan line SL.

Figure 3:
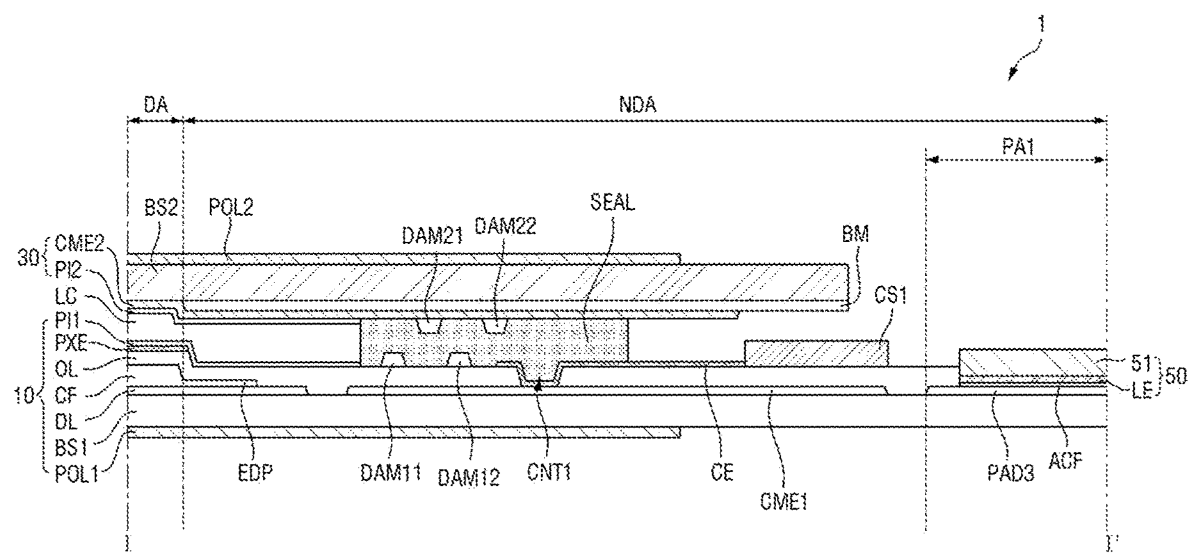
FIG. 3 is a cross-sectional view taken along line I-I' of FIG. 1.
Figure 4:
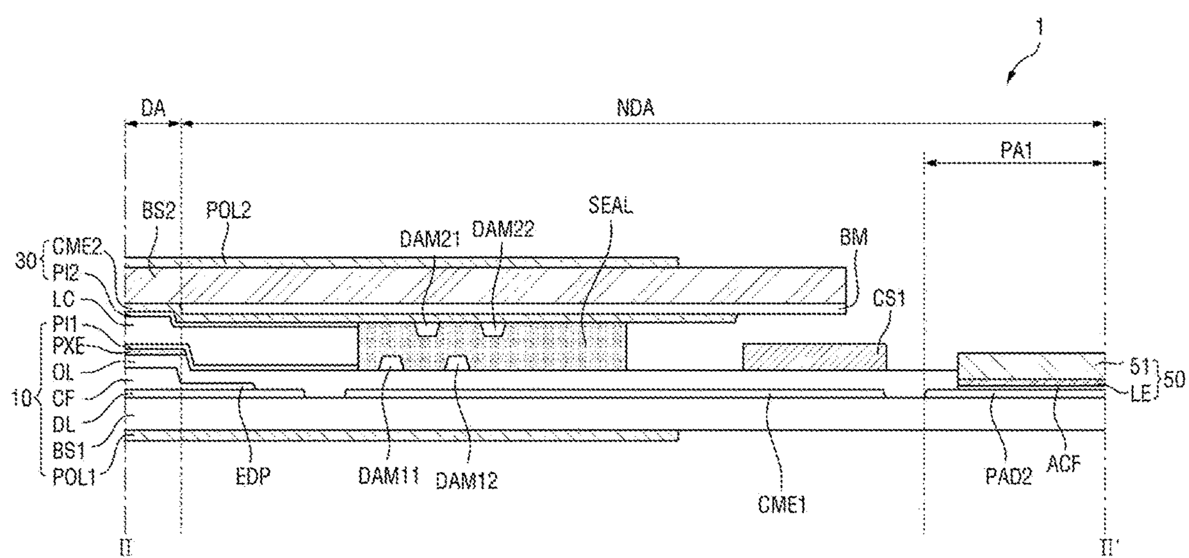
FIG. 4 is a cross-sectional view taken along line II-II' of FIG. 1.
Figure 5:
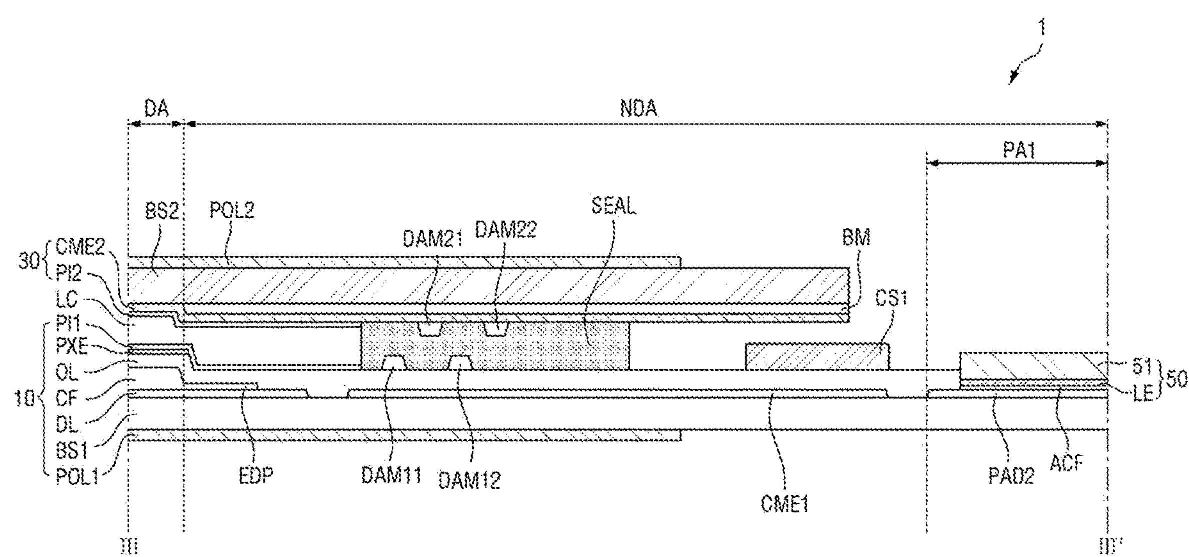
FIG. 5 is a cross-sectional view taken along line III-III' of FIG. 1.
Figure 6:
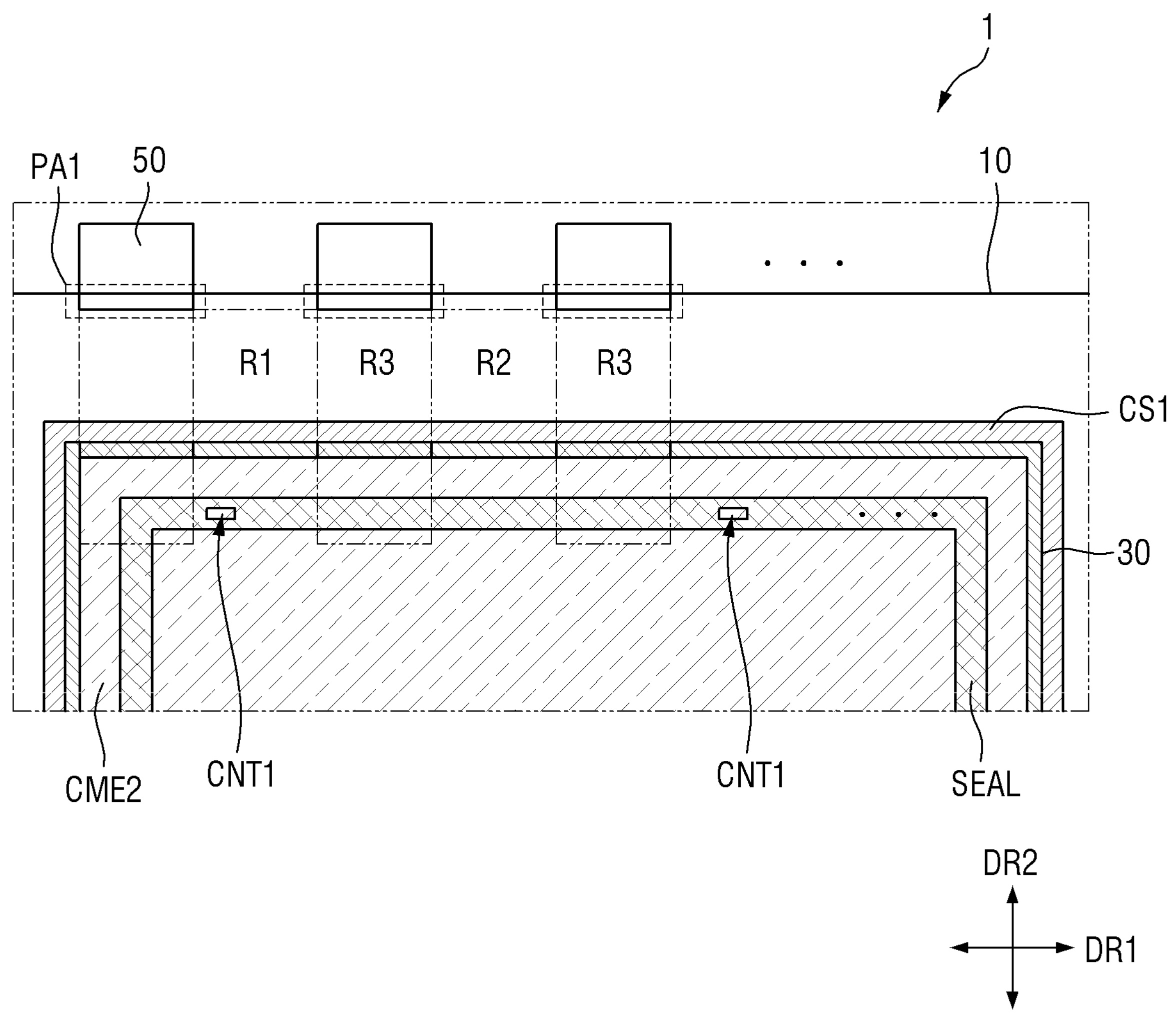
FIG. 6 is a plan view of first printed circuit films and an upper common electrode of the display device according to the embodiment.

FIG. 3 is a cross-sectional view taken along line I-I' of FIG. 1. FIG. 4 is a cross-sectional view taken along line II-II' of FIG. 1. FIG. 5 is a cross-sectional view taken along line III-III' of FIG. 1. FIG. 6 is a plan view of the first printed circuit films 50 and an upper common electrode CME2 of the display device 1 according to the embodiment.

FIG. 3 illustrates a cross-sectional shape of a region extending from an area (where the first contact hole CNT1 is located) overlapping a space between adjacent first printed circuit films 50 along the second direction DR2 to the first pad area PAL. FIG. 4 illustrates a cross-sectional shape of a region extending from an area (where the first contact hole CNT1 is not located) overlapping a space between adjacent first printed circuit films 50 along the second direction DR2 to the first pad area PAL. FIG. 5 illustrates a cross-sectional shape of a region extending from an area overlapping a first printed circuit film 50 along the second direction DR2 to the first pad area PA1.

Referring to FIGS. 3 through 5, the display device 1 may include the lower substrate 10 and the upper substrate 30 facing the lower substrate 10. The lower substrate 10 may include a lower base substrate BS1, a data line DL disposed on the lower base substrate BS1 in the display area DA and a part of the non-display area NDA, a lower common electrode CME1 and the third pad PAD3 located in the non-display area NDA, a color filter CF disposed on the data line DL in the display area DA, an electrostatic discharge prevention circuit EDP disposed on the data line DL in the non-display area NDA, an organic layer OL disposed on the color filter CF and the electrostatic discharge prevention circuit EDP and over the display area DA and the non-display area NDA, a pixel electrode PXE disposed on the organic layer OL in the display area DA, a connection electrode CE located on the organic layer OL in the non-display area NDA, a first alignment layer PI1 disposed on the pixel electrode PXE in the display area DA and disposed in a part of the non-display area NDA, and the lower column spacer CS1 disposed on the organic layer OL in the non-display area NDA.

The lower base substrate BS1 may include a rigid material such as glass or quartz.

A lower polarizing layer POL1 may be further disposed on a lower surface of the lower base substrate BS1. Although not illustrated, the lower polarizing layer POL1 may transmit only a specific polarization of light received from a backlight unit and absorb the other polarizations. An absorption axis of the lower polarizing layer POL1 may be perpendicular to an absorption axis of an upper polarizing layer POL2 to be described later, and a transmission axis of the lower polarizing layer POL1 may be perpendicular to a transmission axis of the upper polarizing layer POL2.

The data line DL and the lower common electrode CME1 may be disposed on the lower base substrate BS1. The data line DL may be electrically connected to the second pad PAD2 as described above with reference to FIG. 2. The lower common electrode CME1 may be disposed in the non-display area NDA. The lower common electrode CME1 may overlap the sealant SEAL and the lower column spacer CS1 in a thickness direction. An inner side surface (a side surface facing the display area DA) of the lower common electrode CME1 may be located closer to the display area DA than the sealant SEAL, and an outer side surface (a side surface facing an opposite direction from the display area DA) of the lower common electrode CME1 may overlap the lower column spacer CS1. The outer side surface of the lower common electrode CME1 may be located closer to a first printed circuit film 50 than a side surface of an end on a long side located on the first side of the second direction DR2 of an upper base substrate BS2 which is disposed on a long side located on the first side of the second direction DR2. The lower common electrode CME1 may protrude further outward than the side surface of the end) of the upper base substrate BS2 which is disposed on the long side located on the first side of the second direction DR2. However, embodiments are not limited to this case, and the outer side surface of the lower common electrode CME1 may also be located farther from the first printed circuit film 50 than the side surface of the end of the upper base substrate BS2 which is disposed on the long side located on the first side of the second direction DR2. Alternatively, the lower common electrode CME1 may be recessed further inwardly than the side surface of the end of the upper base substrate BS2 which is disposed on the long side located on the first side of the second direction DR2.

The third pad PAD3 may be located in the first pad area PAL. The third pad PAD3 may be electrically connected to the lower common electrode CME1.

Each of the data line DL, the third pad PAD3, and the lower common electrode CME1 may be made of a metal material having conductivity. For example, each of the data line DL, the third pad PAD3, and the lower common electrode CME1 may include a single layer or a multilayer containing at least one of aluminum (Al), copper (Cu), titanium (Ti), and molybdenum (Mo).

The data line DL and the lower common electrode CME1 may be physically separated and electrically insulated from each other.

In FIGS. 4 and 5, the second pad PAD2 which is connected to a data line DL instead of the third pad PAD3 which is connected to the lower common electrode CME1 through the connection electrode CE is disposed in the first pad area PAL. The constituent material of the second pad PAD2 and the connection structure of the second pad PAD2 with the first printed circuit film 50 to be described later are substantially the same as those of the third pad PAD3, and thus a redundant description thereof will be omitted.

The color filter CF may be disposed on the data line DL in the display area DA. The color filter CF may include a red color filter, a green color filter, and a blue color filter. The red color filter, the green color filter, and the blue color filter may be disposed in a red pixel, a green pixel, and a blue pixel, respectively.

The color filter CF may not be disposed in the non-display area NDA.

The electrostatic discharge prevention circuit EDP may be disposed on the data line DL in the non-display area NDA. The electrostatic discharge prevention circuit EDP may include at least one thin-film transistor. The electrostatic discharge prevention circuit EDP may prevent static electricity from being applied from the non-display area NDA to the display area DA. However, embodiments are not limited to this case, and a conventional structure for preventing discharge of static electricity, which is widely known in the art, may also be applicable to the electrostatic discharge prevention circuit EDP.

The organic layer OL may be disposed on the color filter CF and the electrostatic discharge prevention circuit EDP. The organic layer OL may include an organic insulating material. The organic layer OL may directly contact the data line DL and the lower common electrode CME1 exposed by the electrostatic discharge prevention circuit EDP and the color filter CF. The organic layer OL may be disposed over the display area DA and the non-display area NDA. The organic layer OL may extend up to cover a part of the first pad area PA1 of the lower base substrate BS1.

The organic layer OL may partially expose an upper surface of the third pad PAD3. An anisotropic conductive film ACF may be disposed on the partially exposed upper surface of the third pad PAD3, and the first printed circuit film 50 may be attached to the third pad PAD3 with the anisotropic conductive film ACF interposed between them. The first printed circuit film 50 may include a first printed base film 51 and a lead wiring LE disposed on a lower surface of the first printed base film 51. The lead wiring LE may be electrically connected to the third pad PAD3 through the anisotropic conductive film ACF.

The organic layer OL may include the first contact hole CNT1 described above. The first contact hole CNT1 may be formed through the organic layer OL along the thickness direction to expose an upper surface of the lower common electrode CME1. The first contact hole CNT1 may overlap the sealant SEAL in the thickness direction.

Referring to FIG. 6, a first region R1 and a second region R2 may be defined as areas which does not overlap the first printed circuit films 50 along the second direction DR2. In other words, the first region R1 and the second region R2 are areas which overlap spaces between adjacent first printed circuit films along the second direction DR2. A third region R3 may be defined as an area overlapping a first printed circuit film 50 along the second direction DR2. The first region R1, the second region R2, and the third region R3 may be repeatedly arranged along the first direction DR1. The first region R1 or the second region R2 may be located in an area adjacent to each of a first side and a second side of the third region R3 in the first direction DR1.

For example, as illustrated in FIG. 6, the third region R3 may be located on a first side of the first region R1 in the first direction DR1, the second region R2 may be located on the first side of the third region R3 in the first direction DR1, and the third region R3 may be located on a first side of the second region R2 in the first direction DR1.

Each of the first region R1 and the second region R2 may be surrounded by a first extension line which connects sides of adjacent first printed circuit films 50 along the first direction DR1, second extension lines which extend along sides of the adjacent first printed circuit films 50 along the second direction DR2, respectively, and an inner side of the sealant SEAL which extends along the first direction DR1. The first extension lines may extend along the first direction DR1, and the second extension lines may extend along the second direction DR2.

The third region R3 may be surrounded by sides of the first printed circuit films 50 which extend along the first direction DR1, the second extension lines which extend along the second direction DR2, and the inner side of the sealant SEAL which extends along the first direction DR1.

The first region R1 and the second region R2 may be distinguished according to whether or not the first contact hole CNT1 is disposed in the region. The first contact hole CNT1 may be located in the first region R1 and may not be located in the second region R2.

FIG. 3 illustrates the cross-sectional shape of the first region R1, FIG. 4 illustrates the cross-sectional shape of the second region R2, and FIG. 5 illustrates the cross-sectional shape of the third region R3.

Referring again to FIGS. 3 through 5, the pixel electrode PXE located in the display area DA and the connection electrode CE located in the non-display area NDA may be disposed on the organic layer OL. The connection electrode CE may be disposed in the first region R1 and may not be disposed in each of the second region R2 and the third region R3.

The pixel electrode PXE may be disposed in the display area DA and may not be disposed in the non-display area NDA. The pixel electrode PXE may form an electric field with the upper common electrode CME2 with a liquid crystal layer LC interposed between them, thereby forming a liquid crystal capacitor.

The connection electrode CE may be disposed in the first region R1 as described above. The connection electrode CE may be electrically connected to the lower common electrode CME1 through the first contact hole CNT1. An inner side surface (a side surface facing the display area DA) of the connection electrode CE may overlap the sealant SEAL, and an outer side surface (a side surface facing the opposite direction from the display area DA) of the connection electrode CE may be located closer to the first pad area PA1 than an outer side surface of the sealant SEAL.

The pixel electrode PXE and the connection CE may include the same material and may be simultaneously formed through the same process.

For example, the pixel electrode PXE and the connection electrode CE may include a transparent conductive material. For example, the pixel electrode PXE and the connection electrode CE may include indium_tin_oxide (ITO), indium_zinc_oxide (IZO), zinc oxide (ZnO), or indium oxide ($In_2O_3$). The pixel electrode PXE and the connection electrode CE may be physically separated and electrically insulated from each other.

The first alignment layer PI1 may be disposed on the pixel electrode PXE and may be disposed in a part of the non-display area NDA.

The lower column spacer CS1 may be disposed outside the sealant SEAL. The lower column spacer CS1 may protrude further outwardly than the side surface of the end of the upper base substrate BS2 which is disposed on the long side located on the first side of the second direction DR2. For example, an inner side surface of the lower column spacer CS1 may be located between the side surface of the end of the upper base substrate BS2 which is disposed on the long side located on the first side of the second direction DR2 and the outer side surface of the sealant SEAL, and an outer side surface of the lower column spacer CS1 may be located outside the side surface of the end of the upper base substrate BS2 which is disposed on the long side located on the first side of the second direction DR2.

The end of the upper base substrate BS2 which is disposed on the long side located on the first side of the second direction DR2 is formed through a cutting process. Since the lower column spacer CS1 protrudes further outwardly than the side surface of the end of the upper base substrate BS2 which is disposed on the long side located on the first side of the second direction DR2, the lower substrate 10 can be prevented from being damaged during the process of cutting the end of the upper base substrate BS2 which is disposed on the long side located on the first side of the second direction DR2.

The lower column spacer CS1 may include an organic insulating material.

The lower column spacer CS1 may prevent the sealant SEAL from flowing toward the outside (toward an end) of each of the base substrates BS1 and BS2 when the sealant SEAL is formed.

The lower column spacer CS1 may be spaced apart from the upper substrate 30 in the thickness direction.

An outer side surface of the connection electrode CE may contact the inner side surface of the lower column spacer CS1, but embodiments are not limited to this case.

The upper substrate 30 may include the upper base substrate BS2, a black matrix BM located in the non-display area NDA, the upper common electrode CME2 disposed over the display area DA and the non-display area NDA, and a second alignment layer PI2 located in the display area DA.

The upper base substrate BS2 may face the lower base substrate BS1. The upper base substrate BS2 may include a rigid material such as glass or quartz. The side surface of the end of the upper base substrate BS2 which is disposed on the long side located on the first side of the second direction DR2 may be located inside an end of the lower base substrate BS1 which is disposed on a long side located on the first side of the second direction DR2.

The upper polarizing layer POL2 may be further disposed on an upper surface of the upper base substrate BS2. The absorption axis of the upper polarizing layer POL2 may be perpendicular to the absorption axis of the lower polarizing layer POL1, and the transmission axis of the upper polarizing layer POL2 may be perpendicular to the transmission axis of the lower polarizing layer POL1.

The black matrix BM may be disposed on a lower surface of the upper base substrate BS2. The black matrix BM may be located in the non-display area NDA and may not be located in light emitting regions in the display area DA.

The upper common electrode CME2 may be disposed on a lower surface of the black matrix BM. The upper common electrode CME2 may overlap the black matrix BM in the thickness direction and overlap the pixel electrode PXE of the lower substrate 10 in the thickness direction. The upper common electrode CME2 may directly contact the lower surface of the black matrix BM.

The upper common electrode CME2 may form a liquid crystal capacitor with the pixel electrode PXE through the liquid crystal layer LC interposed between them as described above.

The upper common electrode CME2 may include Li, Ca, LiF/Ca, LiF/Al, Al, Mg, Ag, Pt, Pd, Ni, Au, Nd, Ir Cr, BaF, Ba, or a compound or mixture of the same (e.g., a mixture of Ag and Mg).

The upper common electrode CME2 may have a different planar shape and cross-sectional shape in each of the regions R1 through R3.

The second alignment layer PI2 may be disposed on a lower surface of the upper common electrode CME2. The second alignment layer PI2 may be disposed in the display area DA and a part of the non-display area NDA.

The liquid crystal layer LC and the sealant SEAL may be disposed between the lower substrate 10 and the upper substrate 30. The sealant SEAL may completely surround the liquid crystal layer LC in a plan view. The sealant SEAL may be located outside the liquid crystal layer LC, and a side surface of an inner side of the sealant SEAL may directly contact the liquid crystal layer LC. The side surface of the inner side of the sealant SEAL may contact each of the alignment layers PI1 and PI2.

The sealant SEAL may bond the lower substrate 10 and the upper substrate 30 together. The sealant SEAL may include a sticky or adhesive material. Each of the upper substrate 30 and the lower substrate 10 may further include a plurality of dam structures. For example, the lower substrate 10 may include dam structures disposed between the organic layer OL and the sealant SEAL. The upper substrate 30 may include dam structures disposed between the upper common electrode CME2 and the sealant SEAL. The dam structures of the lower substrate 10 and the upper substrate 30 may prevent the alignment layers PI1 and PI2 from reflowing to ends of the substrates 10 and 30. The lower substrate 10 may include, for example, a (1-1)th dam structure DAM11 and a (1-2)th dam structure DAM12, and the upper substrate 30 may include, for example, a (2-1)th dam structure DAM21 and a (2-2)th dam structure DAM22. In cross-section, the dam structures DAM11 and DAM12 of the lower substrate 10 and the dam structures DAM21 and DAM22 may be alternately arranged along the second direction DR2. Since the dam structures DAM11 and DAM12 of the lower substrate 10 and the dam structures DAM21 and DAM22 of the upper substrate 30 are alternately arranged along the second direction DR2 in cross-section, the sealant SEAL may be prevented from agglomerating in a certain portion where a dam structure of the upper substrate 30 and a dam structure of the lower substrate 10 overlap in the thickness direction.

The sealant SEAL according to an embodiment may further include a conductive material. In the first region R1 (see FIG. 6), the sealant SEAL may be disposed between the connection electrode CE electrically connected to the lower common electrode CME1 through the first contact hole CNT1 and the upper common electrode CME2. Since the sealant SEAL further includes a conductive material, the connection electrode CE and the upper common electrode CME2 may be electrically connected to each other. Therefore, a common voltage signal received through the lower common electrode CME1 may be provided to the upper common electrode CME2.

Referring to FIG. 6, the upper common electrode CME2 may be further recessed toward the second side of the second direction DR2 in the first region R1 and the second region R2 than in the third region R3. In other words, the upper common electrode CME2 may protrude further toward the first side of the second direction DR2 in the third region R3 than in the first region R1 and the second region R2.

For example, an end of the upper common electrode CME2 in the first region R1 and the second region R2 may be located inside an end of the upper common electrode CME2 in the third region R3.

For example, the end of the upper common electrode CME2 in the first region R1 and the second region R2 may be located inside the end of the upper base substrate BS2 which is disposed on the long side located on the first side of the second direction DR2.

For example, the end of the upper common electrode CME2 in the third region R3 may be aligned with the end of the upper base substrate BS2 which is disposed on the long side located on the first side of the second direction DR2. However, embodiments are not limited to this case, and the end of the upper common electrode CME2 in the third region R3 may also be located inside the end of the upper base substrate BS2 which is disposed on the long side located on the first side of the second direction DR2.

Referring to FIGS. 3 and 4 together with FIG. 6, an outer side surface of the end of the upper common electrode CME2 may be recessed further inwardly than the side surface of the end of the upper base substrate BS2 which is disposed on the long side located on the first side of the second direction DR2, thereby exposing the lower surface of the black matrix BM. The outer side surface of the end of the upper common electrode CME2 may extend toward the side surface of the end of the upper base substrate BS2 which is disposed on the long side located on the first side of the second direction DR2 than the sealant SEAL.

On the other hand, referring to FIG. 5, the outer side surface of the end of the upper common electrode CME2 may be substantially aligned with the side surface of the end of the upper base substrate BS2 which is disposed on the long side located on the first side of the second direction DR2 in the thickness direction.

Static electricity may be introduced through the upper common electrode CME2 adjacent to the end of the second base substrate BS2.

In the first region R1, the static electricity introduced through the upper common electrode CME2 may be easily dispersed through a path along the sealant SEAL and the connection electrode CE to the lower common electrode CME1.

In the second region R2, the static electricity introduced through the upper common electrode CME2 may not be easily dispersed to the lower common electrode CME1, unlike in the first region R1. This is because the connection electrode CE electrically connected to the upper common electrode CME2 is not disposed in the second region R2 as described above.

Therefore, the static electricity introduced to the second region R2 may not be easily dispersed to the lower substrate 10 but may be discharged through the display area DA, thereby causing damage to the display area DA.

Figure 7:
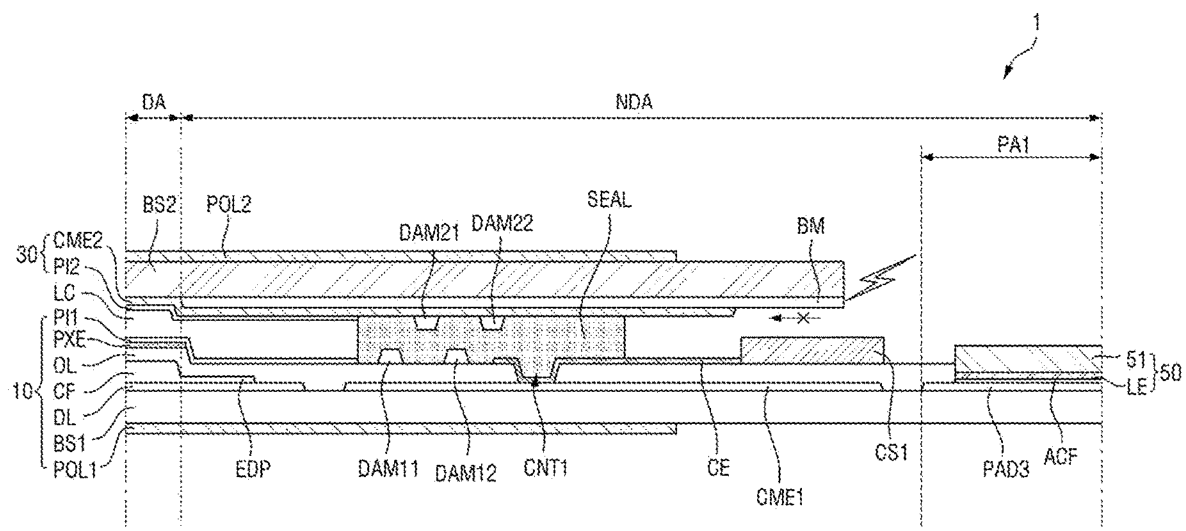
FIGS. 7 and 8 are cross-sectional views illustrating a case where the introduction of static electricity from an end of an upper base substrate is prevented.
Figure 8:
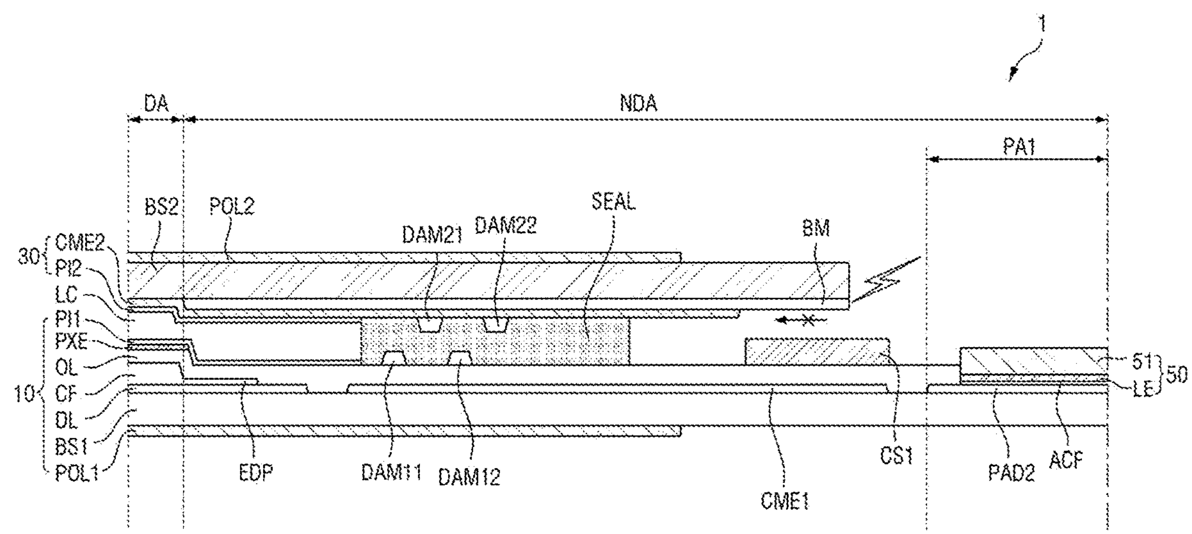

FIGS. 7 and 8 are cross-sectional views illustrating how the introduction of static electricity from the end of the upper base substrate BS2 is prevented.

Referring to FIGS. 7 and 8, in the second region R2 of the display device 1 according to the embodiment, the outer side surface of the end of the upper common electrode CME2 is recessed further inwardly than the side surface of the end of the upper base substrate BS2 which is disposed on the long side located on the first side of the second direction DR2. Therefore, an introduction path of static electricity to the upper common electrode CME2 adjacent to the end of the upper base substrate BS2 may be removed. Accordingly, damage to the display area DA due to the introduced static electricity can be reduced.

Furthermore, in the first region R1, the outer side surface of the end of the upper common electrode CME2 is recessed further inwardly than the side surface of the end of the upper base substrate BS2 which is disposed on the long side located on the first side of the second direction DR2. Therefore, even if there is a dispersion path of static electricity through the lower common electrode CME1, since the introduction path of static electricity to the upper common electrode CME2 adjacent to the end of the upper base substrate BS2 is removed, damage to the display area DA can be further reduced.

In some embodiments, the upper common electrode CME2 may be further recessed toward the second side of the second direction DR2 in the second region R2 than in the first region R1. In other words, the upper common electrode CME2 may protrude further toward the first side of the second direction DR2 in the first region R1 than in the second region R2.

In the above embodiments, for example, the end of the upper common electrode CME2 in the second region R2 may be located inside the end of the upper common electrode CME2 in the first region R1.

In the above embodiments, for example, the end of the upper common electrode CME2 in the second region R2 may be aligned with the end of the upper base substrate BS2 which is disposed on the long side located on the first side of the second direction DR2. Alternatively, the end of the upper common electrode CME2 in the second region R2 may be located inside the end of the upper base substrate BS2 which is disposed on the long side located on the first side of the second direction DR2.

The above embodiments may correspond to a case where the outer side surface of the end of the upper common electrode CME2 protrudes further outwardly in the first region R1 than the lower common electrode CME1 in the second region R2 without the need to be recessed further inwardly than the side surface of the end of the upper base substrate BS2 which is disposed on the long side located on the first side of the second direction DR2 because the dispersion path of static electricity through the lower common electrode CME1 is provided in the first region R1.

Embodiments of the display device 1 described above will now be described. In the following embodiments, the same elements as those of the above-described embodiment will be indicated by the same reference characters, and a description thereof will be omitted or given briefly.

Figure 9:
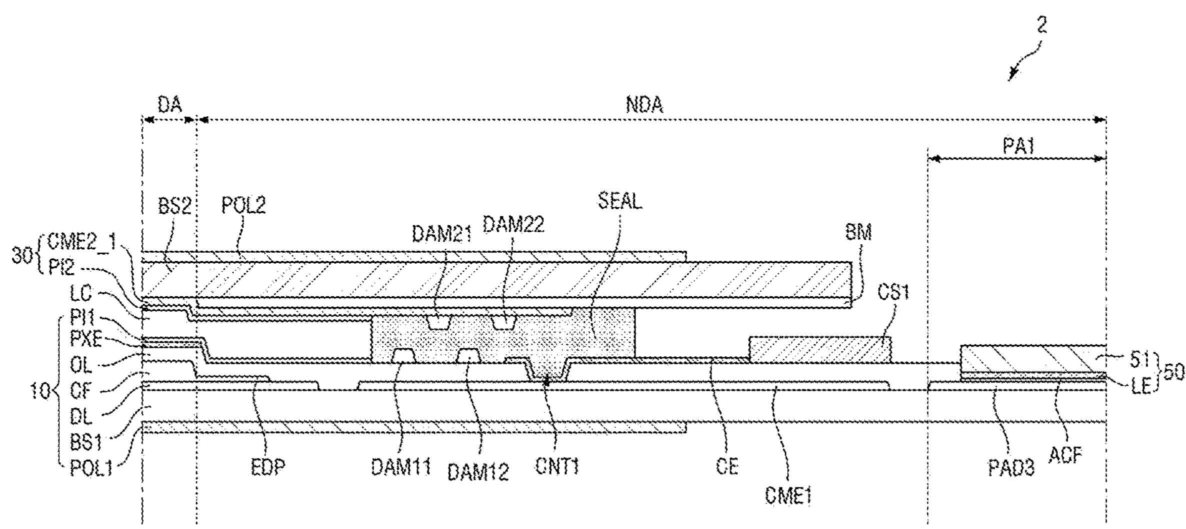
FIGS. 9 and 10 are cross-sectional views of a display device according to an embodiment.
Figure 10:
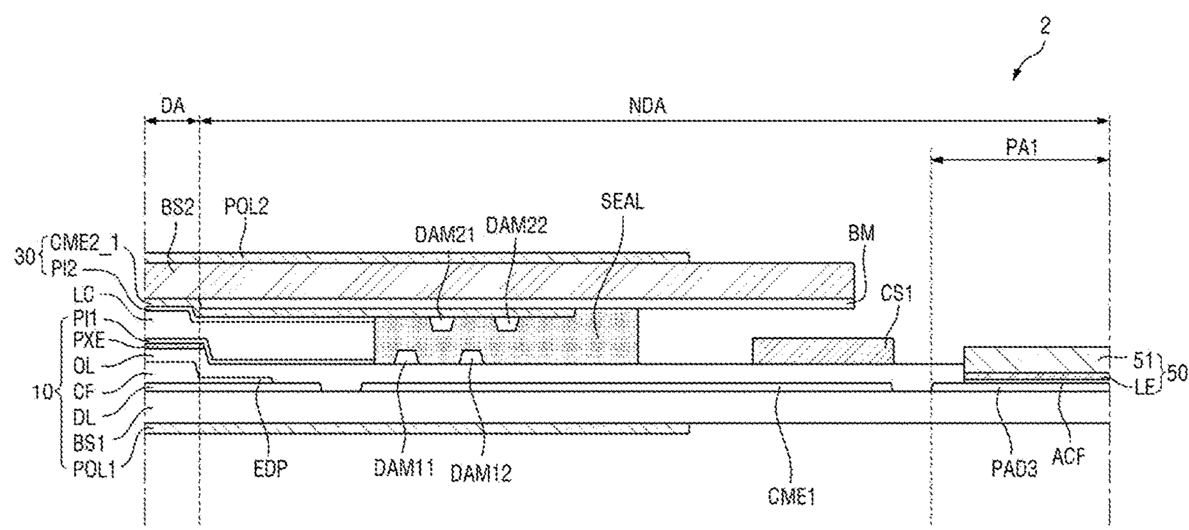

FIGS. 9 and 10 are cross-sectional views of a display device 2 according to an embodiment. FIG. 9 illustrates a cross-sectional shape of a first region R1 (see FIG. 6), and FIG. 10 illustrates a cross-sectional shape of a second region $R^2$ (see FIG. 6).

Referring to FIGS. 9 and 10, the display device 2 according to the current embodiment is different from the display device 1 according to the embodiment of FIGS. 3 and 4 in that an outer side surface of an end of an upper common electrode CME2_1 is located inside an outer side surface of a sealant SEAL.

More specifically, in the display device 2 according to the current embodiment, the outer side surface of the end of the upper common electrode CME2_1 may be located inside the outer side surface of the sealant SEAL.

The outer side surface of the end of the upper common electrode CME2_1 may be located between an inner side surface of an inner side and the outer side surface of the sealant SEAL in the thickness direction.

Other details are the same as those described above with reference to FIGS. 1 through 8, and thus a redundant description thereof will be omitted.

Figure 11:
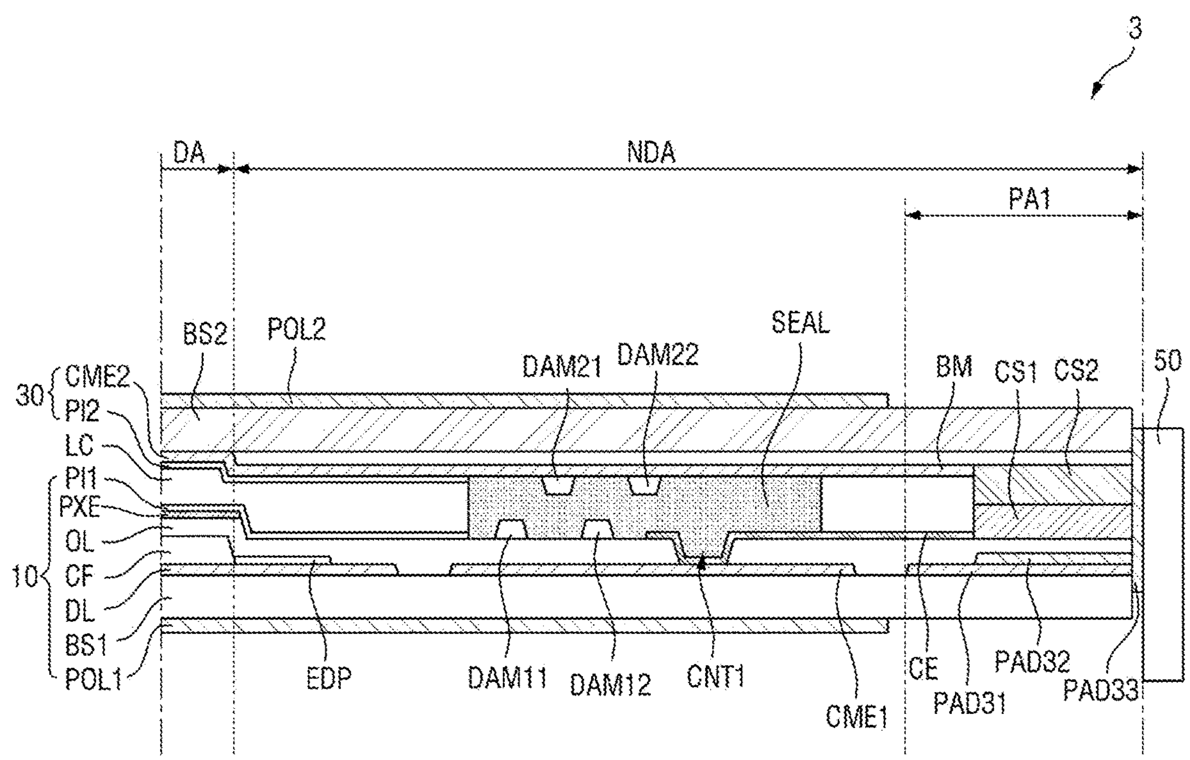
FIGS. 11 and 12 are cross-sectional views of a display device according to an embodiment.
Figure 12:
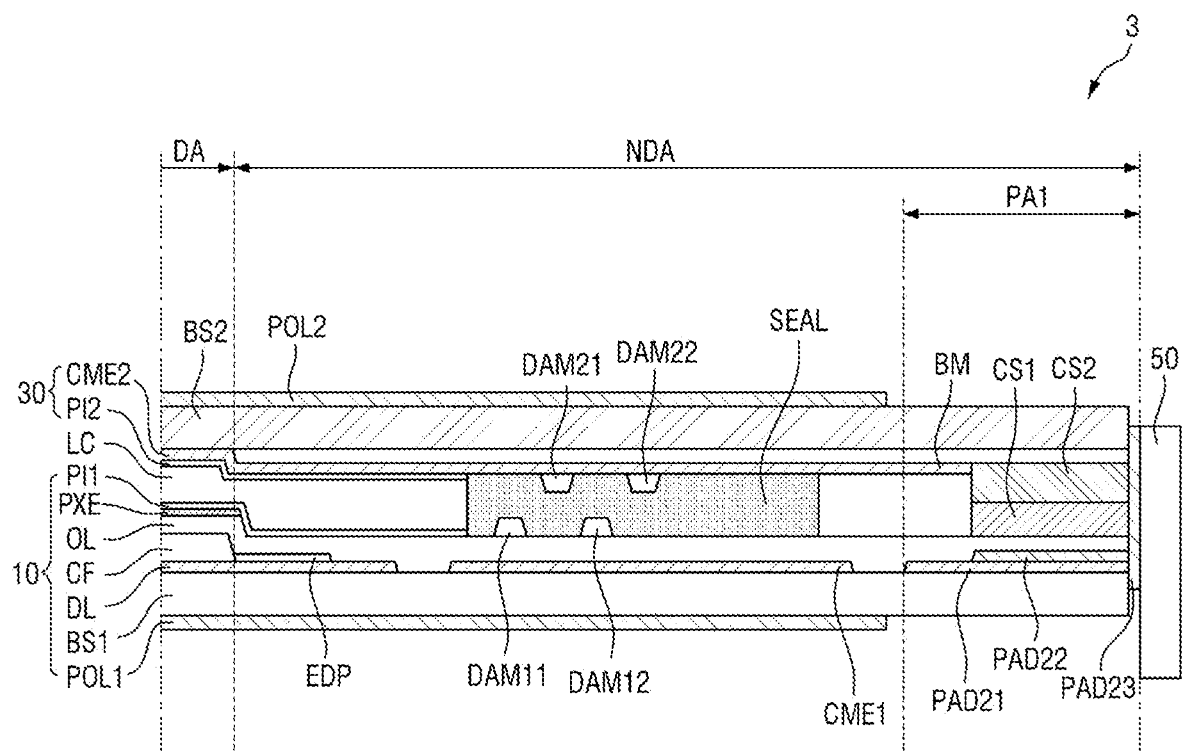

FIGS. 11 and 12 are cross-sectional views of a display device 3 according to an embodiment.

Referring to FIGS. 11 and 12, the display device 3 according to the current embodiment is different from the display device 1 according to the embodiment of FIGS. 3 and 4 in that a first printed circuit film 50 is attached to side surfaces of a lower substrate 10 and an upper substrate 30.

More specifically, in the display device 3 according to the current embodiment, the first printed circuit film 50 may be attached to the side surfaces of the lower substrate 10 and the upper substrate 30. A plurality of first printed circuit films 50 may be arranged to be spaced apart from each other along a direction in which the side surfaces of the lower substrate 10 and the upper substrate 30 extend.

Referring to FIG. 11, in a first pad area PA1, a $(3\text{-}1)^{th}$ pad PAD31 may be disposed on a lower base substrate BS1, and a $(3\text{-}2)^{th}$ pad PAD32 may be disposed on the $(3\text{-}1)^{th}$ pad PAD31. An organic layer OL described above may be disposed on the $(3\text{-}2)^{t}$ pad PAD32. An inner side surface of the $(3\text{-}2)^{th}$ pad PAD32 may be located closer to the first printed circuit film 50 than an inner side surface of the $(3\text{-}1)^{th}$ pad PAD31. The organic layer OL may directly contact an upper surface of the $(3\text{-}1)^{th}$ pad PAD31 exposed by the $(3\text{-}2)^{th}$ pad PAD32 and an upper surface of the $(3\text{-}2)^{th}$ pad PAD32. FIG. 12 is the same as FIG. 11 except that $(2\text{-}1)^{th}$ through $(2\text{-}3)^{th}$ pads PAD21 through PAD23 are disposed instead of the $(3\text{-}1)^{th}$ through $(3\text{-}3)^{th}$ pads PAD31 through PAD33, and thus a redundant description thereof will be omitted.

In some embodiments, in the first pad area PA1, the $(3\text{-}2)^{th}$ pad PAD32 may be omitted, and only the $(3\text{-}1)^{th}$ pad PAD31 may be disposed.

The $(3\text{-}3)^{th}$ pad PAD33 may be disposed on the side surfaces of the lower substrate 10 and the upper substrate 30. The $(3\text{-}3)^{th}$ pad PAD33 may include a conductive material such as silver (Ag), but the material of the $(3\text{-}3)^{th}$ pad PAD33 is not limited to the conductive material.

The upper substrate 30 may further include an upper column spacer CS2. The upper column spacer CS2 may be directly disposed on a lower surface of a black matrix BM. A lower column spacer CS1 and the upper column spacer CS2 may overlap each other in the thickness direction and may have the same width in the second direction DR2 in cross section.

The upper column spacer CS2 may directly contact the lower column spacer CS1. The upper column spacer CS2 may directly contact an outer side surface of an upper common electrode CME2.

The (3-3)th pad PAD33 may be disposed on side surfaces of the lower base substrate BS1, the (3-1)th pad PAD31, the (3-2)th pad PAD32, the organic layer OL, the column spacers CS1 and CS2, the black matrix BM, and an upper base substrate BS2. For example, the (3-3)th pad PAD33 may be directly disposed on the side surfaces of the lower base substrate BS1, the (3-1)th pad PAD3, the (3-2)th pad PAD32, the organic layer OL, the column spacers CS1 and CS2, the black matrix BM, and the upper base substrate BS2. The (3-3)th pad PAD33 may be disposed on the first printed circuit film 50.

In the display device 3 according to the current embodiment, since the first printed circuit film 50 is attached onto the side surfaces of the substrates 10 and 30, a bezel area can be reduced.

Furthermore, as in the embodiment (of FIGS. 3 and 4), in a second region R2, an outer side surface of an end of the upper common electrode CME2 is recessed further inwardly than aside surface of an end of the upper base substrate BS2 which is disposed on a long side located on the first side of the second direction DR2. Therefore, an introduction path of static electricity to the upper common electrode CME2 adjacent to the end of the upper base substrate BS2 may be removed. Accordingly, damage to a display area DA due to the introduced static electricity can be reduced.

Furthermore, in a first region R1, the outer side surface of the end of the upper common electrode CME2 is recessed further inwardly than the side surface of the end of the upper base substrate BS2 which is disposed on the long side located on the first side of the second direction DR2. Therefore, even if there is a dispersion path of static electricity through a lower common electrode CME1, since the introduction path of static electricity to the upper common electrode CME2 adjacent to the end of the upper base substrate BS2 is removed, damage to the display area DA can be reduced.

Figure 13:
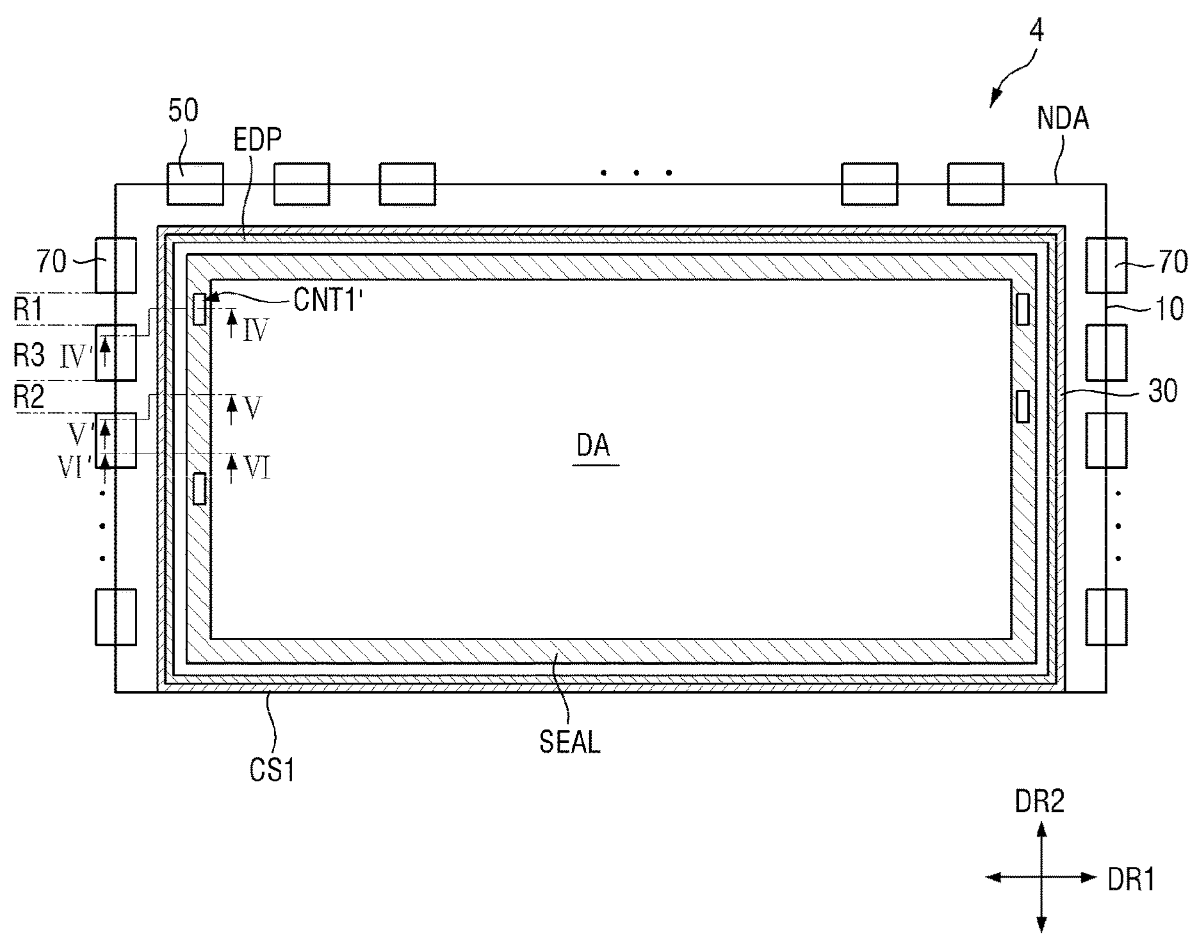
FIG. 13 is a plan view of a display device according to an embodiment.
Figure 14:
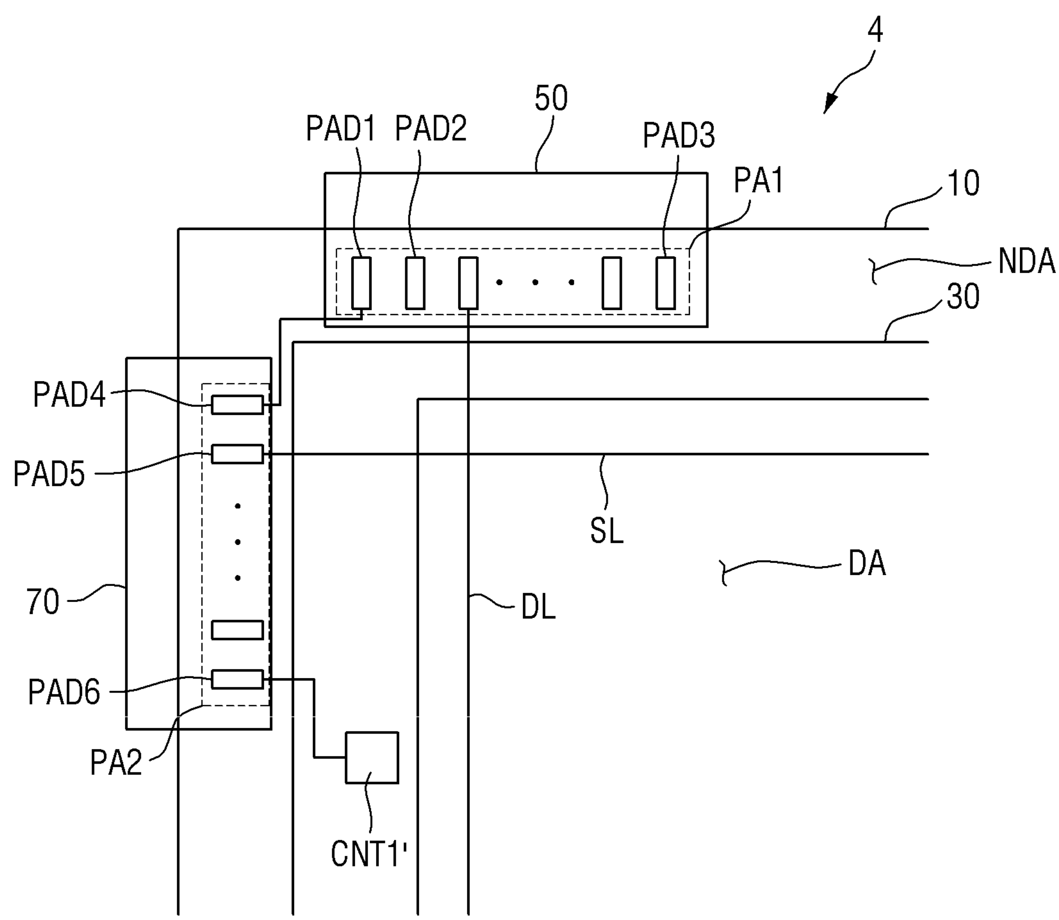
FIG. 14 is an enlarged plan view of pad areas of FIG. 13 and a part adjacent to the pad areas.
Figure 15:
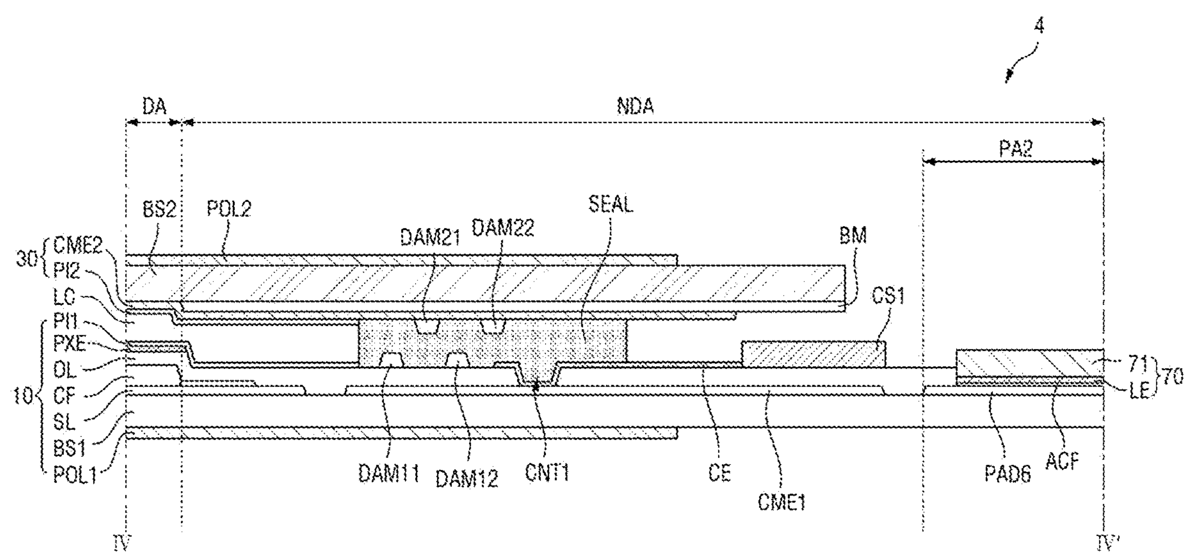
FIG. 15 is a cross-sectional view taken along line IV-IV' of FIG. 13.
Figure 16:
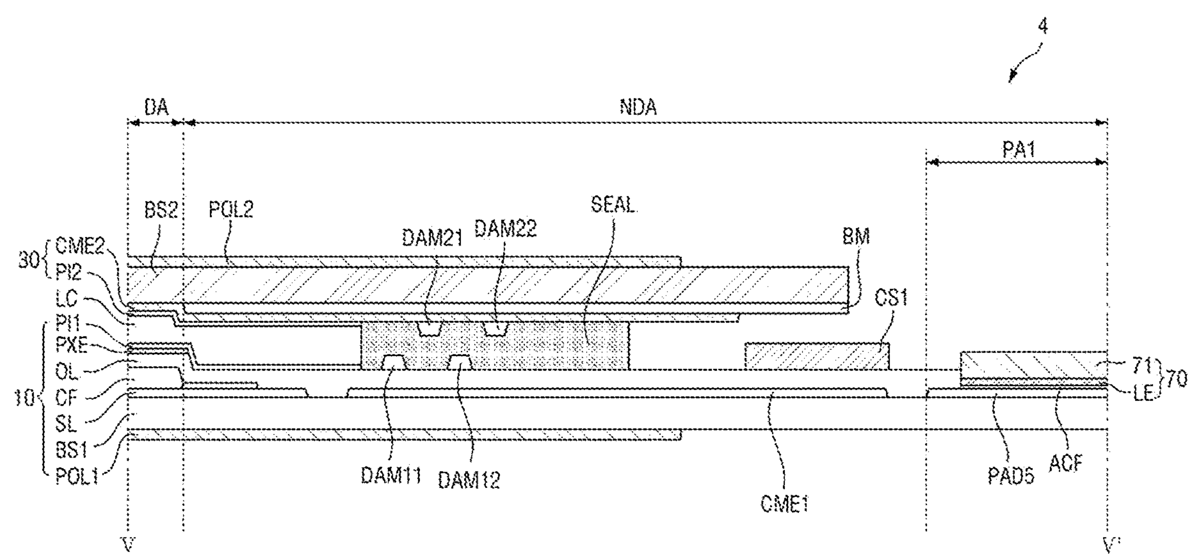
FIG. 16 is a cross-sectional view taken along line V-V' of FIG. 13.
Figure 17:
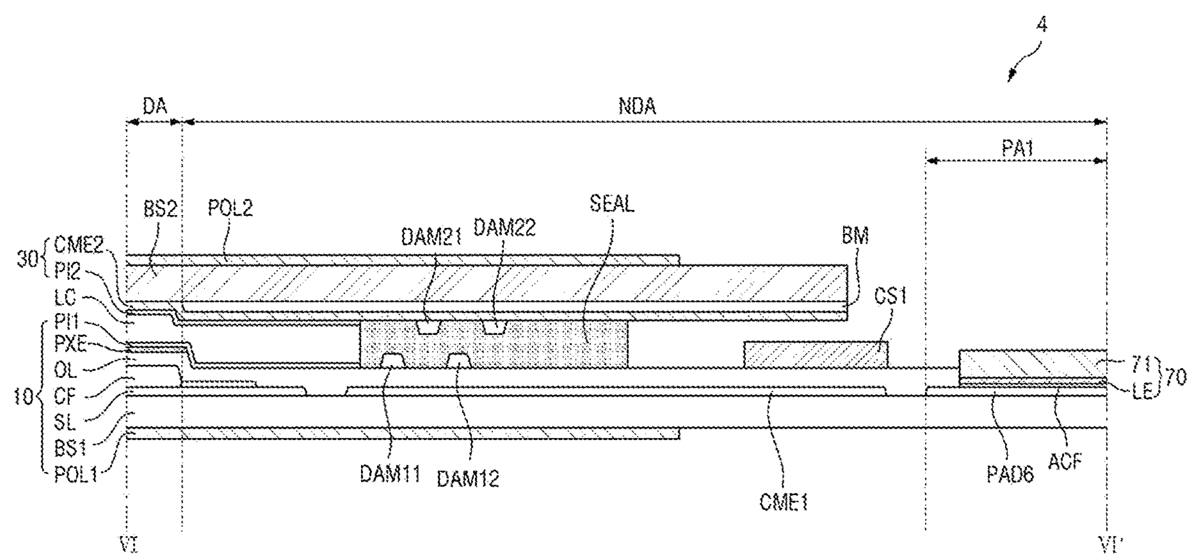
FIG. 17 is a cross-sectional view taken along line VI-VI' of FIG. 13.

FIG. 13 is a plan view of a display device 4 according to an embodiment. FIG. 14 is an enlarged plan view of pad areas of FIG. 13 and a part adjacent to the pad areas. FIG. 15 is a cross-sectional view taken along line IV-IV' of FIG. 13. FIG. 16 is a cross-sectional view taken along line V-V' of FIG. 13. FIG. 17 is a cross-sectional view taken along line VI-VI' of FIG. 13.

Referring to FIGS. 13 through 17, the display device 4 according to the current embodiment is different from the display device 1 according to the embodiment (of FIGS. 1 through 5) in that the concept of the shape of the upper common electrode CME2 according to the relative position of the upper common electrode CME2 with the first printed circuit films 50 of the display device 1 according to the embodiment (of FIGS. 1 through 5) may be applied to short sides of the display device 4.

FIG. 15 illustrates a cross-sectional shape of a region extending from an area where a first contact hole CNT1' is located and overlapping a space between adjacent second printed circuit films 70 along the first direction DR1 to a second pad area PA2. FIG. 16 illustrates a cross-sectional shape of a region extending from an area where the first contact hole CNT1' is not located and overlapping a space between adjacent second printed circuit films 70 along the first direction DR1 to the second pad area PA2. FIG. 17 illustrates a cross-sectional shape of a region extending from an area overlapping a second printed circuit film 70 along the first direction DR1 to the second pad area PA2.

More specifically, the first contact hole CNT1' may be located in an area overlapping a space between adjacent second printed circuit films 70 along the first direction DR1. The first contact hole CNT1' may connect a connection electrode CE and a lower common electrode CME1. The area overlapping the space between the adjacent second printed circuit films 70 along the first direction DR1 may be provided in plural numbers. The areas overlapping the spaces between a plurality of adjacent second printed circuit films 70 along the first direction DR1 may be arranged along the second direction DR2. The first contact hole CNT1' may or may not be located in any one of the areas overlapping the spaces between the adjacent second printed circuit films 70 along the first direction DR1.

Referring to FIG. 14, a non-display area NDA adjacent to a short side of the display device 4 located on the second side of the first direction DR1, that is, the non-display area NDA corresponding to parts of a lower substrate 10 which protrude from short sides of an upper substrate 30 located on the first side and the second side of the first direction DR1 in a plan view may include the second pad area PA2. A plurality of pads PAD may include a first pad PAD1, a second pad PAD2, a third pad PAD3, a fourth pad PAD4, a fifth pad PAD5, and a sixth pad PAD6. The fourth through sixth pads PAD4 through PAD6 may be disposed in the second pad area PA2.

A second printed circuit film 70 may be connected to the fourth through sixth pads PAD4 through PAD6.

The sixth pad PAD6 may be configured to transmit a common voltage signal received from the second printed circuit film 70 to the first contact hole CNT1'. The common voltage signal provided to the sixth pad PAD6 may be provided to the lower common electrode CME1 located in the first contact hole CNT1', and the common voltage signal provided to the lower common electrode CME1 may be provided to the connection electrode CE through the first contact hole CNT1'.

The fourth pad PAD4 may be configured to transmit a scan control signal received from the first pad PAD1 to the second printed circuit film 70, and the fifth pad PAD5 may be electrically connected to a scan line SL and configured to transmit a scan signal received from the second printed circuit film 70 to the scan line SL.

The lower substrate 10 of the display device 4 has the scan line SL.

The sixth pad PAD6 may be located in the second pad area PA2. The sixth pad PAD6 may be electrically connected to the lower common electrode CME1 through the connection electrode CE.

In FIGS. 16 and 17, the fifth pad PAD5 is disposed in the second pad area PA2. The connection of the fifth pad PAD5 with the second printed circuit film 70 is substantially the same as that of the sixth pad PAD6, and thus a redundant description thereof will be omitted.

A color filter CF may be disposed on the scan line SL in the display area DA.

An electrostatic discharge prevention circuit EDP may be disposed on the scan line SL in the non-display area NDA.

An organic layer OL may partially expose an upper surface of the sixth pad PAD6. An anisotropic conductive film ACF may be disposed on the partially exposed upper surface of the sixth pad PAD6, and the second printed circuit film 70 may be attached to the sixth pad PAD6 with the anisotropic conductive film ACF interposed between them. The second printed circuit film 70 may include a second printed base film 71 and a lead wiring LE disposed on a lower surface of the second printed base film 71. The lead wiring LE may be electrically connected to the sixth pad PAD6 through the anisotropic conductive film ACF.

The organic layer OL may include the first contact hole CNT1' described above. The first contact hole CNT1' may expose an upper surface of the lower common electrode CME1. The first contact hole CNT1' may overlap a sealant SEAL in the thickness direction.

Like the regions R1 through R3 described above with reference to FIG. 6, a first region and a second region may be defined in areas overlapping spaces between adjacent second printed circuit films 70 along the first direction DR1. A third region may be defined in an area overlapping a second printed circuit film 70 along the first direction DR1. The first region, the second region, and the third region may be repeatedly arranged along the second direction DR2. The first region or the second region may be located in an area adjacent to each of a first side and a second side of the third region in the second direction DR2.

Each of the first region and the second region may be surrounded by a first extension line which connects sides of adjacent second printed circuit films 70 along the second direction DR2, second extension lines which extend along sides of the adjacent second printed circuit films 70 along the first direction DR1, respectively, and an inner side of the sealant SEAL which extends along the second direction DR1. The first extension lines may extend along the second direction DR2, and the second extension lines may extend along the first direction DR1.

The third region may be surrounded by sides of the second printed circuit films 70 which extend along the second direction DR2, the second extension lines which extend along the first direction DR1, and the inner side of the sealant SEAL which extends along the second direction DR2.

The first region and the second region may be distinguished according to whether or not the first contact hole CNT1' is located in the regions. The first contact hole CNT1' may be located in the first region and may not be located in the second region.

FIG. 15 illustrates the cross-sectional shape of the first region, FIG. 16 illustrates the cross-sectional shape of the second region, and FIG. 17 illustrates the cross-sectional shape of the third region.

The connection electrode CE may be disposed in the first region. The connection electrode CE may be electrically connected to the lower common electrode CME1 through the first contact hole CNT1'. An inner side surface (a side surface facing the display area DA) of the connection electrode CE may overlap the sealant SEAL, and an outer side surface (a side surface facing an opposite direction from the display area DA) of the connection electrode CE may be located closer to the second pad area PA2 than an outer side surface of the sealant SEAL.

In the first region, the sealant SEAL may be disposed between the connection electrode CE electrically connected to the lower common electrode CME1 through the first contact hole CNT1' and an upper common electrode CME2. Since the sealant SEAL further includes a conductive material, the connection electrode CE and the upper common electrode CME2 may be electrically connected to each other. Therefore, a common voltage signal received through the lower common electrode CME1 may be provided to the upper common electrode CME2.

The upper common electrode CME2 may be further recessed toward the first side of the first direction DR1 in the first region and the second region than in the third region. In other words, the upper common electrode CME2 may protrude further toward the second side of the first direction DR1 in the third region than in the first region and the second region.

For example, an end of the upper common electrode CME2 in the first region and the second region may be located inside an end of the upper common electrode CME2 in the third region.

For example, the end of the upper common electrode CME2 in the first region and the second region may be located inside an end of an upper base substrate BS2 which is disposed on a short side located on the second side of the first direction DR1.

For example, the end of the upper common electrode CME2 in the third region may be aligned with the end of the upper base substrate BS2 which is disposed on the short side located on the second side of the first direction DR1. However, embodiments are not limited to this case, and the end of the upper common electrode CME2 in the third region may also be located inside the end of the upper base substrate BS2 which is disposed on the short side located on the second side of the first direction DR1.

An outer side surface of the end of the upper common electrode CME2 may be recessed further inwardly than a side surface of the end of the upper base substrate BS2 which is disposed on the short side located on the second side of the first direction DR1, thereby exposing a lower surface of a black matrix BM. The outer side surface of the end of the upper common electrode CME2 may be located outside the outer side surface of the sealant SEAL.

On the other hand, referring to FIG. 17, the outer side surface of the end of the upper common electrode CME2 may be substantially aligned with the side surface of the end of the upper base substrate BS2 which is disposed on the short side located on the second side of the first direction DR2 in the thickness direction.

Static electricity may be introduced through the upper common electrode CME2 adjacent to the end of the second base substrate BS2.

In the first region, the static electricity introduced through the upper common electrode CME2 may easily dispersed through a path along the sealant SEAL and the connection electrode CE to the lower common electrode CME1.

In the second region, the static electricity introduced through the upper common electrode CME2 may not be easily dispersed to the lower common electrode CME1, unlike in the first region. This is because the connection electrode CE electrically connected to the upper common electrode CME2 is not disposed in the second region as described above.

Therefore, the static electricity introduced to the second region may not be easily dispersed to the lower substrate 10 but may be discharged through the display area DA, thereby causing damage to the display area DA.

In the second region of the display device 4 according to the current embodiment, the outer side surface of the end of the upper common electrode CME2 is recessed further inwardly than the side surface of the end of the upper base substrate BS2 which is disposed on the short side located on the second side of the first direction DR1. Therefore, an introduction path of static electricity to the upper common electrode CME2 adjacent to the end of the upper base substrate BS2 may be removed. Accordingly, damage to the display area DA due to the introduced static electricity can be reduced.

Furthermore, in the first region, the outer side surface of the end of the upper common electrode CME2 is recessed further inwardly than the side surface of the end of the upper base substrate BS2 which is disposed on the short side located on the second side of the first direction DR1. Therefore, even if there is a dispersion path of static electricity through the lower common electrode CME1, since the introduction path of static electricity to the upper common electrode CME2 adjacent to the end of the upper base substrate BS2 is removed, damage to the display area DA can be reduced.

Figure 18:
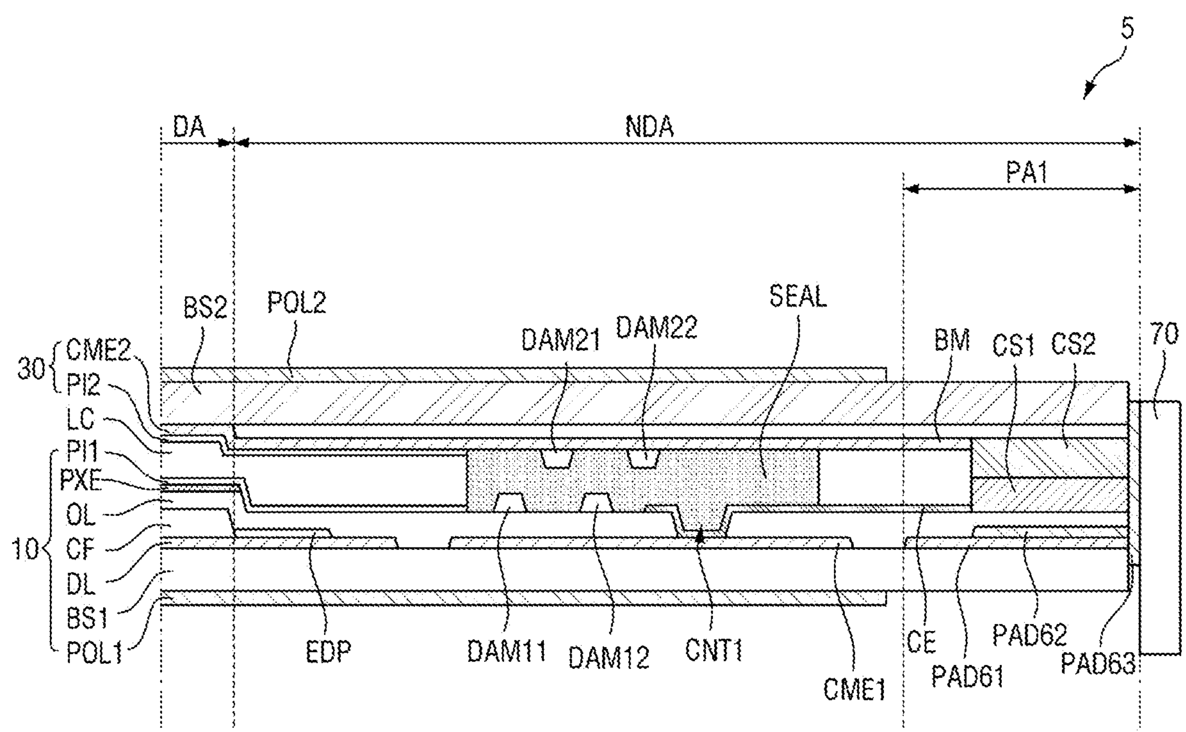
FIGS. 18 and 19 are cross-sectional views of a display device according to an embodiment.
Figure 19:
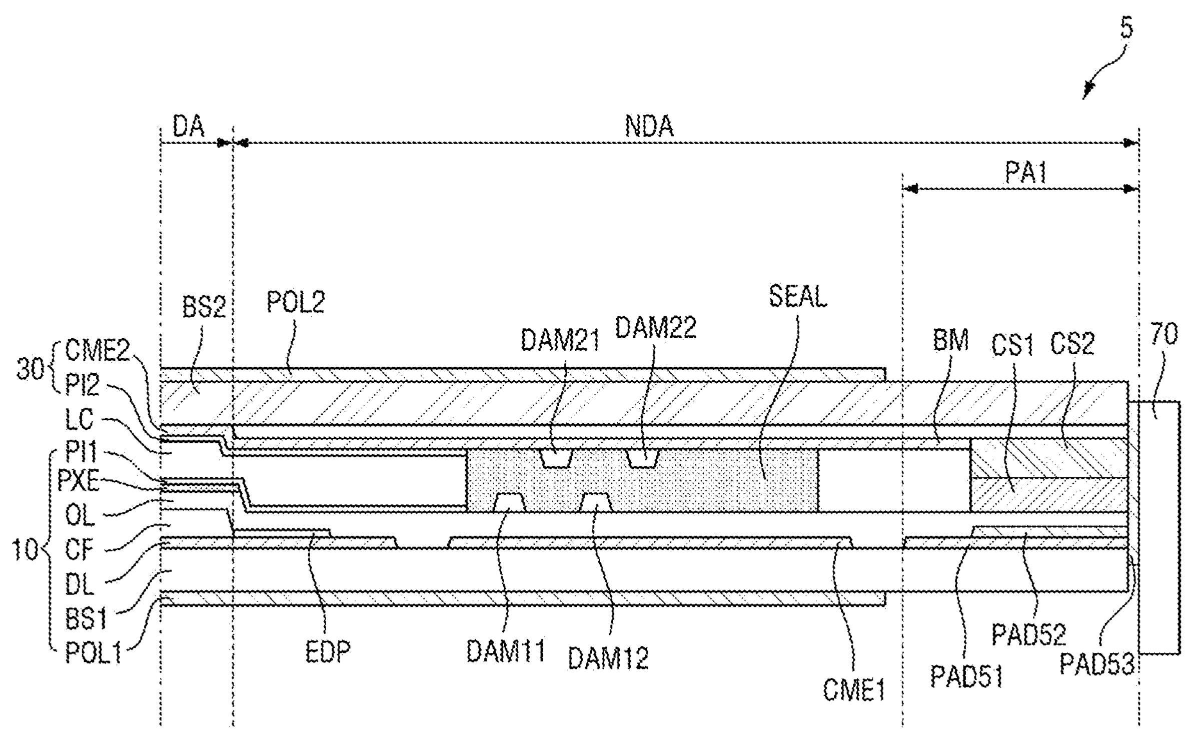

FIGS. 18 and 19 are cross-sectional views of a display device 5 according to an embodiment.

Referring to FIGS. 18 and 19, the display device 5 according to the current embodiment is different from the display device 4 according to the embodiment of FIGS. 15 and 16 in that a second printed circuit film 70 is attached to side surfaces of a lower substrate 10 and an upper substrate 30.

More specifically, in the display device 5 according to the current embodiment, the second printed circuit film 70 may be attached to the side surfaces of the lower substrate 10 and the upper substrate 30.

Referring to FIG. 18, in a second pad area PA2, a (6-1)th pad PAD61 may be disposed on a lower base substrate BS1, and a (6-2)th pad PAD62 may be disposed on the (6-1) pad PAD61. An organic layer OL described above may be disposed on the (6-2)$^{th}$ pad PAD62. An inner side surface of the (6-2)$^{th}$ pad PAD62 may be located closer to the second printed circuit film 70 than an inner side surface of the (6-1)$^{th}$ pad PAD61. The organic layer OL may directly contact an upper surface of the (6-1)$^{th}$ pad PAD61 exposed by the (6-2)$^{th}$ pad PAD62 and an upper surface of the (6-2)$^{th}$ pad PAD62.

FIG. 19 is the same as FIG. 18 except that (5-1)$^{th}$ through (5-3)$^{th}$ pads PAD51 through PAD53 are disposed instead of the (6-1) through (6-3)$^{th}$ pads PAD61 through PAD63, and thus a redundant description thereof will be omitted.

In some embodiments, in the second pad area PA2, the (6-2)$^{th}$ pad PAD62 may be omitted, and only the (6-1)$^{th}$ pad PAD61 may be disposed.

The (6-3)$^{th}$ pad PAD63 may be disposed on the side surfaces of the lower substrate 10 and the upper substrate 30. The (6-3)$^{th}$ pad PAD63 may include a conductive material such as silver (Ag), but the material of the (6-3)$^{th}$ pad PAD63 is not limited to the conductive material.

The upper substrate 30 may further include an upper column spacer CS2. The upper column spacer CS2 may be directly disposed on a lower surface of a black matrix BM. A lower column spacer CS1 and the upper column spacer CS2 may overlap each other in the thickness direction and may have the same width in the second direction DR2 in cross section.

The upper column spacer CS2 may directly contact the lower column spacer CS1. The upper column spacer CS2 may directly contact an outer side surface of an upper common electrode CME2.

The (6-3)$^{th}$ pad PAD63 may be disposed on side surfaces of the lower base substrate BS1, the (6-1)th pad PAD61, the (6-2)th pad PAD62, the organic layer OL, the column spacers CS1 and CS2, the black matrix BM, and an upper base substrate BS2. For example, the (6-3)th pad PAD63 may be directly disposed on the side surfaces of the lower base substrate BS1, the (6-1)th pad PAD61, the (6-2)th pad PAD62, the organic layer OL, the column spacers CS1 and CS2, the black matrix BM, and the upper base substrate BS2. The (6-3)th pad PAD63 may be disposed on the second printed circuit film 70.

In the display device 5 according to the current embodiment, since the second printed circuit film 70 is attached onto the side surfaces of the substrates 10 and 30, a bezel area can be reduced.

Furthermore, as in the display device 4 of FIGS. 15 and 16, in a second region, an outer side surface of an end of the upper common electrode CME2 is recessed further inwardly than a side surface of an end of the upper base substrate BS2 which is disposed on a short side located on the second side of the first direction DR1. Therefore, an introduction path of static electricity to the upper common electrode CME2 adjacent to the end of the upper base substrate BS2 may be removed. Accordingly, damage to a display area DA due to the introduced static electricity can be reduced.

Furthermore, in a first region, the outer side surface of the end of the upper common electrode CME2 is recessed further inwardly than the side surface of the end of the upper base substrate BS2 which is disposed on the short side located on the second side of the first direction DR1. Therefore, even if there is a dispersion path of static electricity through a lower common electrode CME1, since the introduction path of static electricity to the upper common electrode CME2 adjacent to the end of the upper base substrate BS2 is removed, damage to the display area DA can be reduced.

Figure 20:
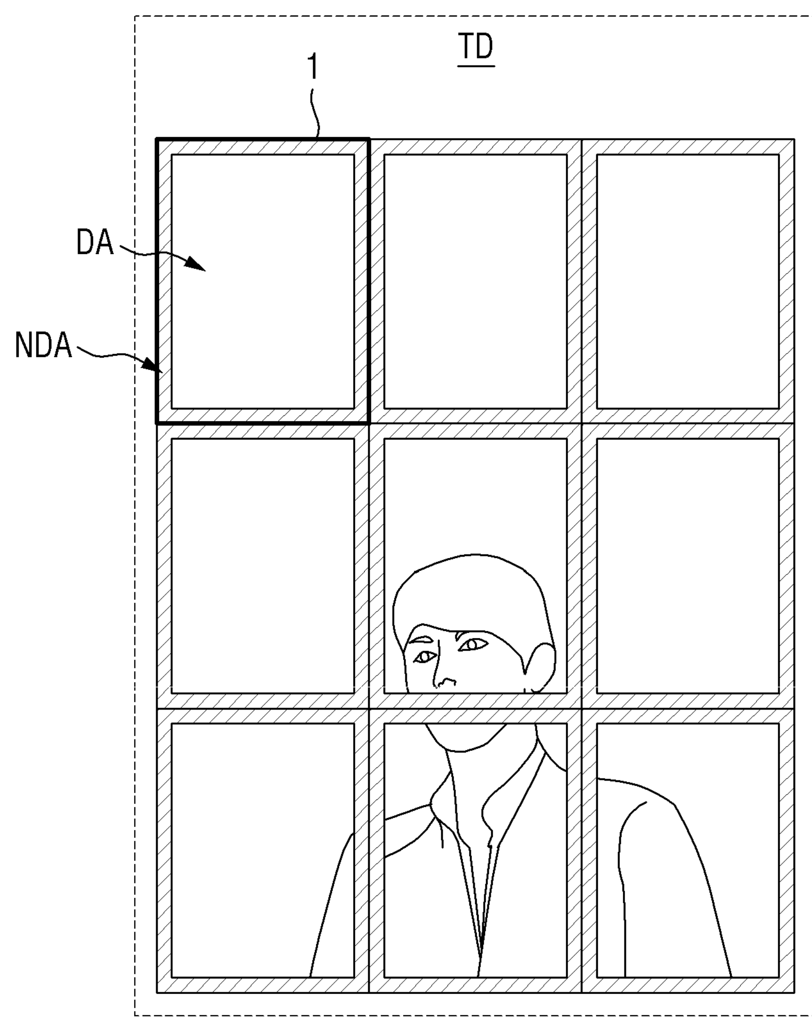
FIG. 20 is a plan view of a display device according to an embodiment.

FIG. 20 is a plan view of a display device TD according to an embodiment.

Referring to FIG. 20, the display device TD according to the current embodiment is different from the display device 1 according to the embodiment (of FIGS. 1 through 6) in that it is a tiled display device and includes a plurality of display devices 1.

Since the display devices 1 included in the display device TD have been described above with reference to FIGS. 1 through 6, a detailed description thereof will be omitted.

Respective long sides or short sides of the display devices 1 may be connected to each other. In addition, some display devices 1 may be disposed along a side of the display device TD, and some display devices 1 may be located at corners of the display device TD to constitute two adjacent sides of the display device TD. Some display devices 1 may be located inside the display device TD and thus surrounded by other display devices 1. The display devices 1 may have different bezel shapes according to their position or may have the same bezel shape.

In a display device according to an embodiment, introduction of static electricity to a display area can be minimized.

However, the effects of the embodiments are not restricted to the one set forth herein. The above and other effects of the embodiments will become more apparent to one of daily skill in the art to which the embodiments pertain by referencing the claims.

What is claimed is:

1. A display device comprising:

an upper base substrate;

a lower base substrate which is disposed under the upper base substrate and protrudes from the upper base substrate along a first direction in a plan view;

a first printed circuit film which is attached to a first pad area in a portion of the lower base substrate protruding from the upper base substrate along the first direction; and an upper common electrode which is disposed between the upper base substrate and the lower base substrate, wherein the first printed circuit film is provided in plural numbers, the first printed circuit films are arranged to be spaced apart from each other along a second direction intersecting the first direction, and the upper common electrode overlapping a space between adjacent first printed circuit films along the first direction is recessed further inwardly in the first direction than the upper common electrode overlapping the first printed circuit film along the first direction.

2. The display device of claim 1, wherein a side surface of the upper common electrode overlapping the first printed circuit film along the first direction is aligned with a side surface of the upper base substrate, and a side surface of the upper common electrode overlapping the space between the adjacent first printed circuit films along the first direction is recessed from the side surface of the upper base substrate.

3. The display device of claim 2, further comprising:

a pixel electrode which is disposed between the lower base substrate and the upper common electrode;

a liquid crystal layer which is disposed between the pixel electrode and the upper common electrode; and a sealant which surrounds the liquid crystal layer in a plan view and is disposed between the upper base substrate and the lower base substrate.

4. The display device of claim 3, wherein the upper common electrode overlapping the space between the adjacent first printed circuit films along the first direction overlaps the sealant, and the side surface of the upper common electrode is disposed between the side surface of the upper base substrate and an outer side surface of the sealant in a plan view.

5. The display device of claim 4, further comprising a lower common electrode which is disposed between the lower base substrate and the sealant.

6. The display device of claim 5, wherein an area overlapping the space between the adjacent first printed circuit films along the first direction comprises a first region which comprises a connection electrode connected to the lower common electrode, and wherein the connection electrode overlaps the sealant and the upper common electrode in a thickness direction.

7. The display device of claim 6, wherein the sealant comprises a conductive material and the connection electrode is electrically connected to the upper common electrode through the conductive material.

8. The display device of claim 7, further comprising an organic layer which is disposed between the lower common electrode and the connection electrode, wherein the organic layer comprises a first contact hole which exposes an upper surface of the lower common electrode, and the connection electrode is electrically connected to the lower common electrode through the first contact hole.

9. The display device of claim 8, further comprising a lower column spacer which is disposed between the organic layer and the upper base substrate, wherein the side surface of the upper common electrode is disposed between an inner side surface of the lower column spacer and the outer side surface of the sealant in a plan view.

10. The display device of claim 9, wherein an outer side surface of the connection electrode contacts the inner side surface of the lower column spacer.

11. The display device of claim 8, further comprising an electrostatic discharge prevention circuit which is disposed between the lower base substrate and the organic layer, wherein the electrostatic discharge prevention circuit is disposed inside the sealant in a plan view.

12. The display device of claim 7, further comprising a common voltage applying pad and a data pad which are disposed in the first pad area, wherein the common voltage applying pad is connected to the lower common electrode, and the data pad is electrically connected to a data line disposed between the lower base substrate and the pixel electrode.

13. The display device of claim 7, further comprising a common voltage applying pad and a scan pad which are disposed in the first pad area, wherein the common voltage applying pad is connected to the lower common electrode, and the scan pad is electrically connected to a scan line disposed between the lower base substrate and the pixel electrode.

14. The display device of claim 3, wherein the upper common electrode overlapping the space between the adjacent first printed circuit films along the first direction overlaps the sealant, and the side surface of the upper common electrode is disposed inside the outer side surface of the sealant.

* * * * *